United States Patent
Baek et al.

(10) Patent No.: US 12,156,130 B2
(45) Date of Patent: Nov. 26, 2024

(54) METHOD AND DEVICE FOR MEASURING LOCATION OF TERMINAL IN WIRELESS COMMUNICATION SYSTEM

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 17/640,611

(22) PCT Filed: Sep. 4, 2020

(86) PCT No.: PCT/KR2020/011972
§ 371 (c)(1),
(2) Date: Mar. 4, 2022

(87) PCT Pub. No.: WO2021/045575
PCT Pub. Date: Mar. 11, 2021

(65) Prior Publication Data
US 2022/0346000 A1     Oct. 27, 2022

(30) Foreign Application Priority Data

Sep. 4, 2019 (KR) .................. 10-2019-0109741
Sep. 4, 2019 (KR) .................. 10-2019-0109773

(51) Int. Cl.
*G01S 5/02* (2010.01)
*H04L 5/00* (2006.01)
(Continued)

(52) U.S. Cl.
CPC ............ *H04W 48/20* (2013.01); *G01S 5/02* (2013.01); *H04L 5/0048* (2013.01); *H04W 48/16* (2013.01); *H04W 72/0446* (2013.01)

(58) Field of Classification Search
CPC ..... G01S 5/02; H04W 48/20; H04W 72/0446; H04W 48/16; H04L 5/0048
(Continued)

(56) References Cited

U.S. PATENT DOCUMENTS

2019/0230618 A1     7/2019  Saur et al.

FOREIGN PATENT DOCUMENTS

KR   1020170030773      3/2017
WO   WO-2012081861 A2 *  6/2012  ............... G01S 5/10
(Continued)

OTHER PUBLICATIONS

Qualcomm Incorporated, "DL and UL NR Positioning Procedures," 3GPP TSG-RAN WG2 #107, R2-1909416, Aug. 2019, 12 pages.
(Continued)

*Primary Examiner* — Harry K Liu
(74) *Attorney, Agent, or Firm* — LEE, HONG, DEGERMAN, KANG & WAIMEY

(57) ABSTRACT

An embodiment is a method for a terminal to perform an operation in a wireless communication system, the method including the steps of: transmitting a participation request message to peripheral anchor nodes (ANs); receiving participation response messages from candidate ANs among the peripheral ANs; selecting final ANs to be used for measuring the location of the terminal from among the candidate ANs; and measuring the location of the terminal using the final ANs.

12 Claims, 26 Drawing Sheets

(51) Int. Cl.
*H04W 48/16* (2009.01)
*H04W 48/20* (2009.01)
*H04W 72/0446* (2023.01)

(58) Field of Classification Search
USPC .......................................... 342/450
See application file for complete search history.

(56) References Cited

FOREIGN PATENT DOCUMENTS

| WO | WO-2017043867 A1 * | 3/2017 | ........... G01S 1/0428 |
|----|----|----|----|
| WO | 2017149435 | 9/2017 | |
| WO | 2019027245 | 2/2019 | |

OTHER PUBLICATIONS

PCT International Application No. PCT/KR2020/011972, Written Opinion of the International Searching Authority dated Dec. 17, 2020, 9 pages.

\* cited by examiner

METHOD AND DEVICE FOR MEASURING LOCATION OF TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2020/011972, filed on Sep. 4, 2020, which claims the benefit of earlier filing date and right of priority to Korean Application Nos. 10-2019-0109741, filed on Sep. 4, 2019, and 10-2019-0109773, filed on Sep. 4, 2019, the contents of which are all incorporated by reference herein in their entirety.

TECHNICAL FIELD

The following description relates to a wireless communication system, and more particularly to a method and device for measuring a location of a user equipment (UE) using sidelink communication.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to determine a procedure for rapidly and accurately measuring the location of a user equipment (UE) using sidelink communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment, a method for performing an operation by a user equipment (UE) in a wireless communication system includes transmitting a participation request message to neighbor anchor nodes (ANs), receiving a participation response message from candidate ANs among the neighbor ANs, selecting final ANs used to measure a location of the UE among the candidate ANs, and measuring the location of the UE based on the final ANs.

According to an embodiment, a user equipment (UE) in a wireless communication system includes at least one processor, and at least one computer memory operatively connected to the at least one processor and configured to store commands for allowing the at least one processor to perform operations when being executed, wherein the operation includes transmitting a participation request message to neighbor anchor nodes (ANs), receiving a participation response message from candidate ANs among the neighbor ANs, selecting final ANs used to measure a location of the UE among the candidate ANs, and measuring the location of the UE based on the final ANs.

An embodiment provides a processor for performing operations for a user equipment (UE) in a wireless communication system, the operations including transmitting a participation request message to neighbor anchor nodes (ANs), receiving a participation response message from candidate ANs among the neighbor ANs, selecting final ANs used to measure a location of the UE among the candidate ANs, and measuring the location of the UE based on the final ANs.

An embodiment provides a computer-readable recording medium for storing at least one computer program including at least one command for allowing at least one processor to perform operations for a user equipment (UE) when being executed by the at least one processor, the operations including transmitting a participation request message to neighbor anchor nodes (ANs), receiving a participation response message from candidate ANs among the neighbor ANs, selecting final ANs used to measure a location of the UE among the candidate ANs, and measuring the location of the UE based on the final ANs.

The measuring the location of the UE may include transmitting a request positioning reference signal (PRS) to the final ANs, receiving a response PRS responding to the request PRS from the final ANs, and measuring the location of the UE based on the request PRS and the response PRS.

The method may further include reserving a resource for the request PRS and the response PRS, and transmitting information on the reserved resource to the final ANs.

The method may further include receiving information on a reception time of the request PRS and a transmission time of the response PRS from the ANs, wherein the location of the UE may be measured based on at least one of a transmission time of the request PRS, a reception time of the request PRS, a transmission time of the response PRS, or a reception time of the response PRS.

The participation request message may include a minimum positioning quality indicator (PQI) value, and the candidate ANs may have a PQI value above the minimum PQI value.

The candidate ANs may have a channel utilization ratio above a threshold.

A channel state value of the candidate ANs and the UE may be above a threshold.

The participation response message may include location information of the candidate ANs and a positioning quality indicator (PQI) value of the location information.

The request PRS may be transmitted in a vehicle-to-everything (V2X) slot or a PRS slot.

The response PRS may be transmitted in a vehicle-to-everything (V2X) slot or a PRS slot.

The UE may communicate with at least one of another UE, a UE related to an autonomous driving vehicle, a base station (BS), or a network.

Advantageous Effects

According to an embodiment, the location of a user equipment (UE) may be rapidly measured using sidelink communication.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
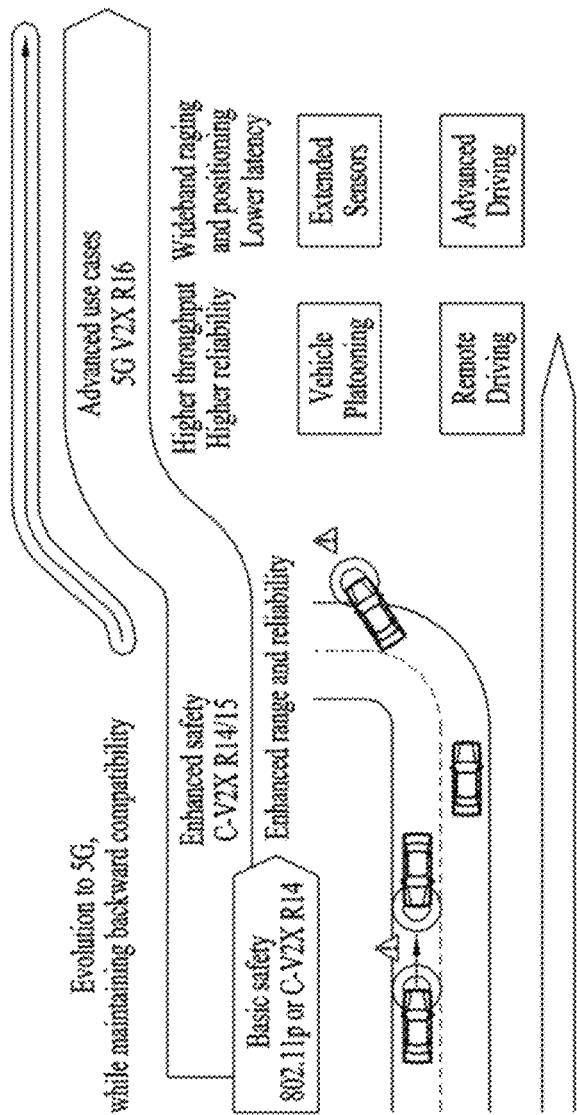
FIG. 1 is a diagram illustrating vehicle-to-everything (V2X) communication based on pre-new radio access technology (NR) RAT and V2X communication based on NR in comparison.
Figure 2:
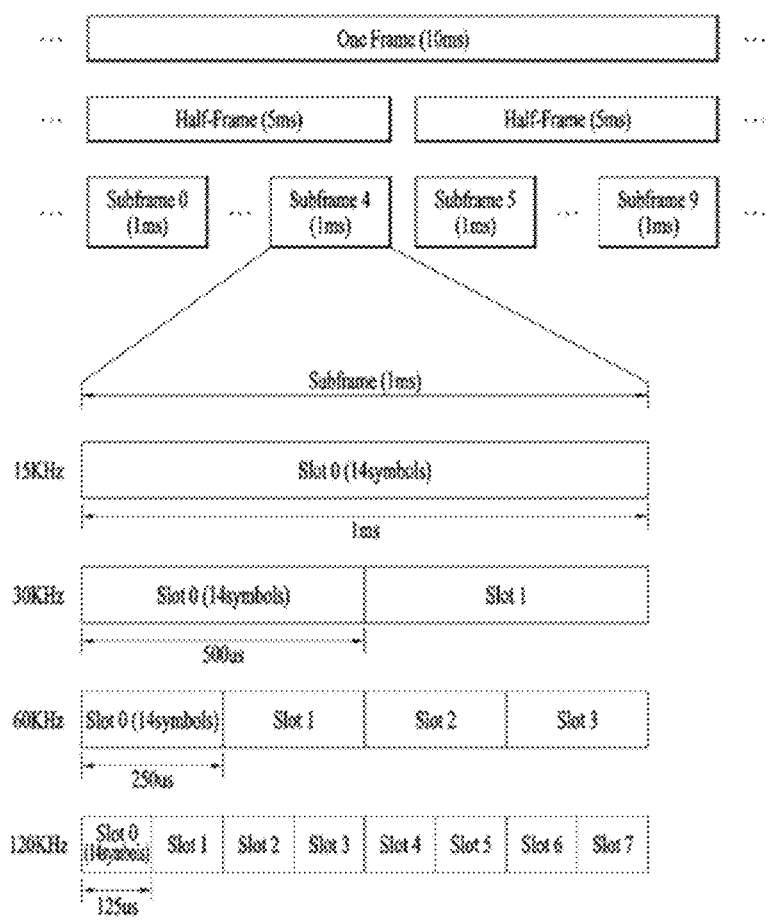
FIG. 2 is a diagram illustrating the structure of an NR radio frame to which embodiment(s) of the present disclosure is applicable.

FIG. 2 illustrates a radio frame structure in NR, to which embodiment(s) of the present disclosure is applicable.

Referring to FIG. 2, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N_{symbol}^{slot}$, the number of slots per frame $N_{slot}^{frame,\mu}$, and the number of slots per subframe $N_{slot}^{subframe,\mu}$ according to an SCS configuration μ in the NCP case.

TABLE 1

| SCS (15*2u) | $N_{symbol}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N_{symbol}^{slot}$ | $N_{slot}^{frame, u}$ | $N_{slot}^{subframe, u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
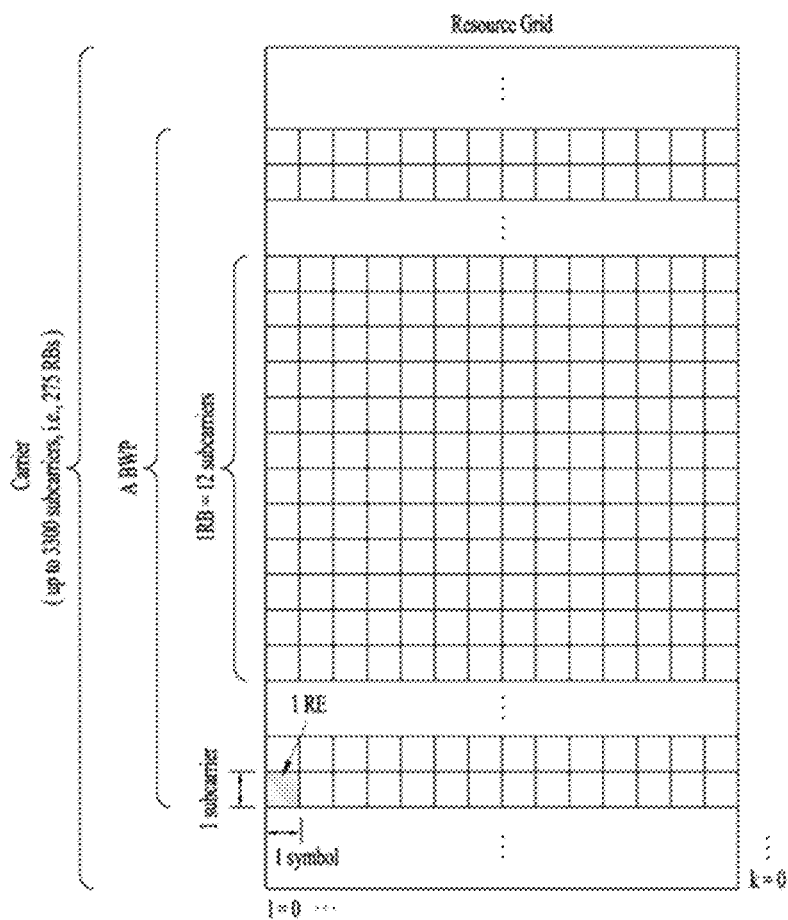
FIG. 3 is a diagram illustrating a slot structure in an NR frame according to an embodiment of the present disclosure.

FIG. 3 illustrates a slot structure in an NR frame according to an embodiment of the present disclosure.

Referring to FIG. 3, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 4:
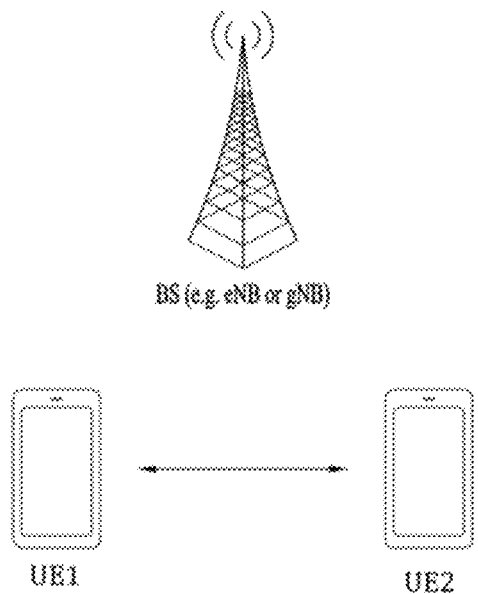
FIG. 4 is a diagram illustrating user equipments (UEs) which conduct V2X or SL communication between them according to an embodiment of the present disclosure.

FIG. 4 illustrates UEs that conduct V2X or SL communication between them according to an embodiment of the present disclosure.

Referring to FIG. 4, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 5:
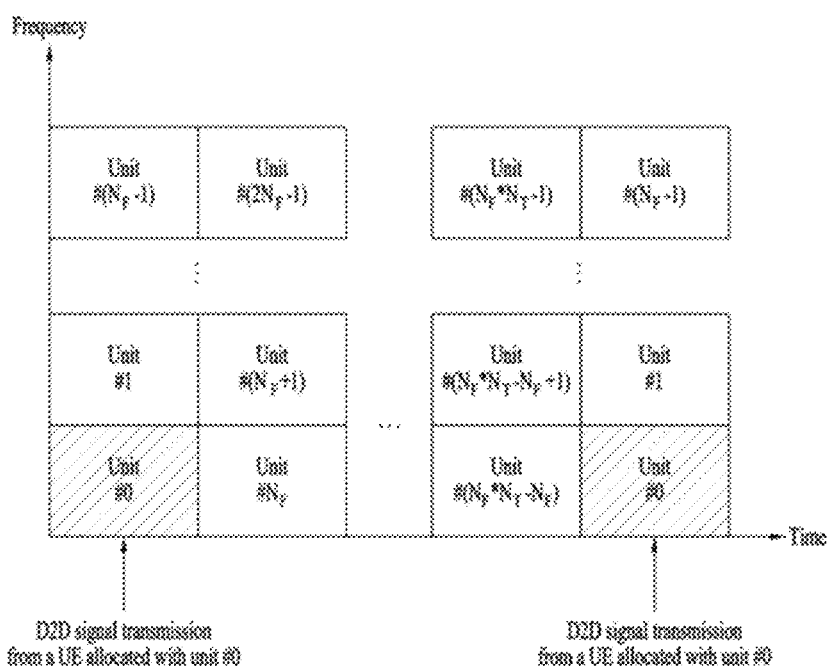
FIG. 5 is diagram illustrating resource units for V2X or SL communication according to an embodiment of the present disclosure.

FIG. 5 illustrates resource units for V2X or SL communication according to an embodiment of the present disclosure.

Figure 13:
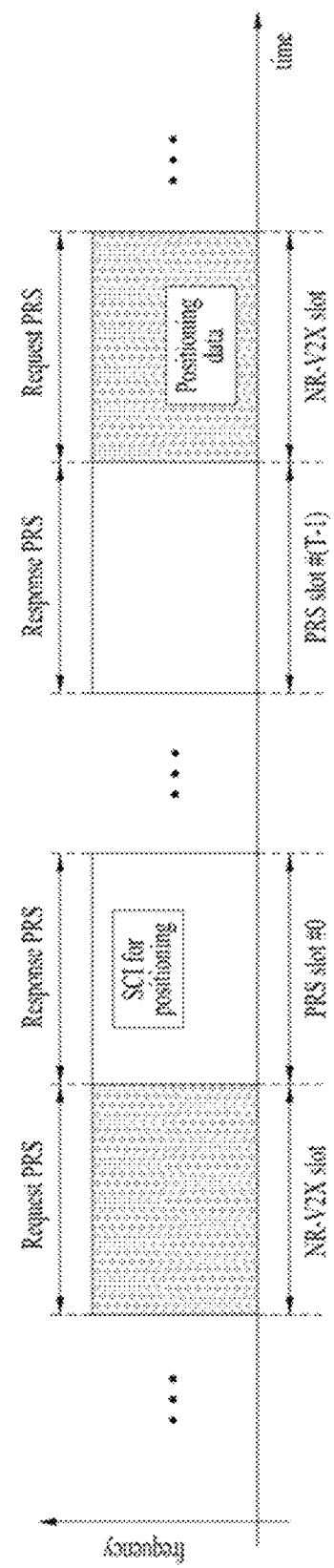

Referring to FIG. 5, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 5, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 6:
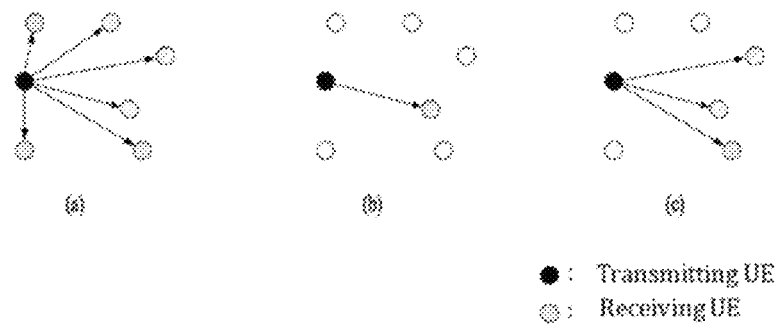
FIG. 6 illustrates three cast types according to an embodiment of the present disclosure.

FIG. 6 illustrates three cast types according to an embodiment of the present disclosure.

In detail, FIG. 6(a) illustrates broadcast type SL communication, FIG. 6(b) illustrates unicast type SL communication, and FIG. 6(c) illustrates groupcast type SL communication. In the case of unicast type SL communication, a UE may perform one-to-one communication with another UE. In the case of groupcast type SL communication, the UE may perform SL communication with one or more UEs in a group to which the UE belongs. According to various embodiments of the present disclosure, SL groupcast communication may be replaced with SL multicast communication, SL one-to-many communication, or the like.

Now, a description will be given of positioning.

Figure 7:
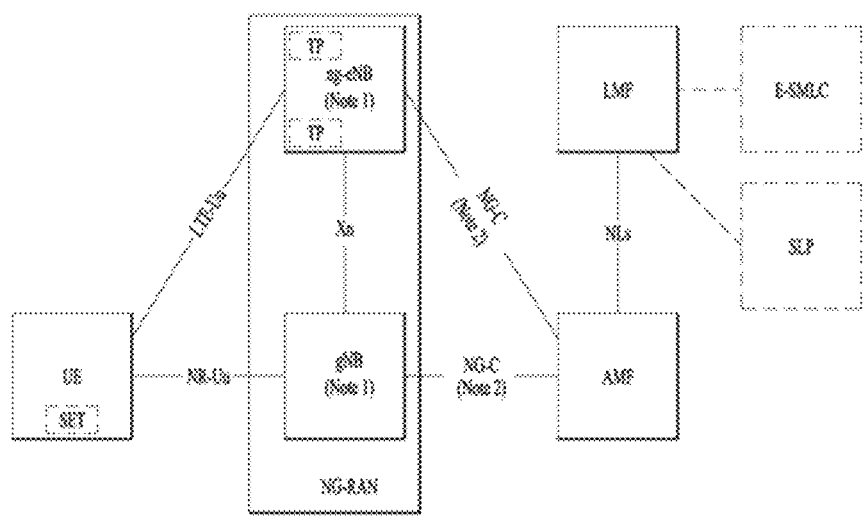
FIG. 7 illustrates an exemplary architecture of a 5G system capable of positioning a UE connected to an NG-RAN or an E-UTRAN according to an embodiment of the present disclosure.

FIG. 7 illustrates an exemplary architecture of a 5G system capable of positioning a UE connected to an NG-RAN or an E-UTRAN according to an embodiment of the present disclosure.

Referring to FIG. 7, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 8:
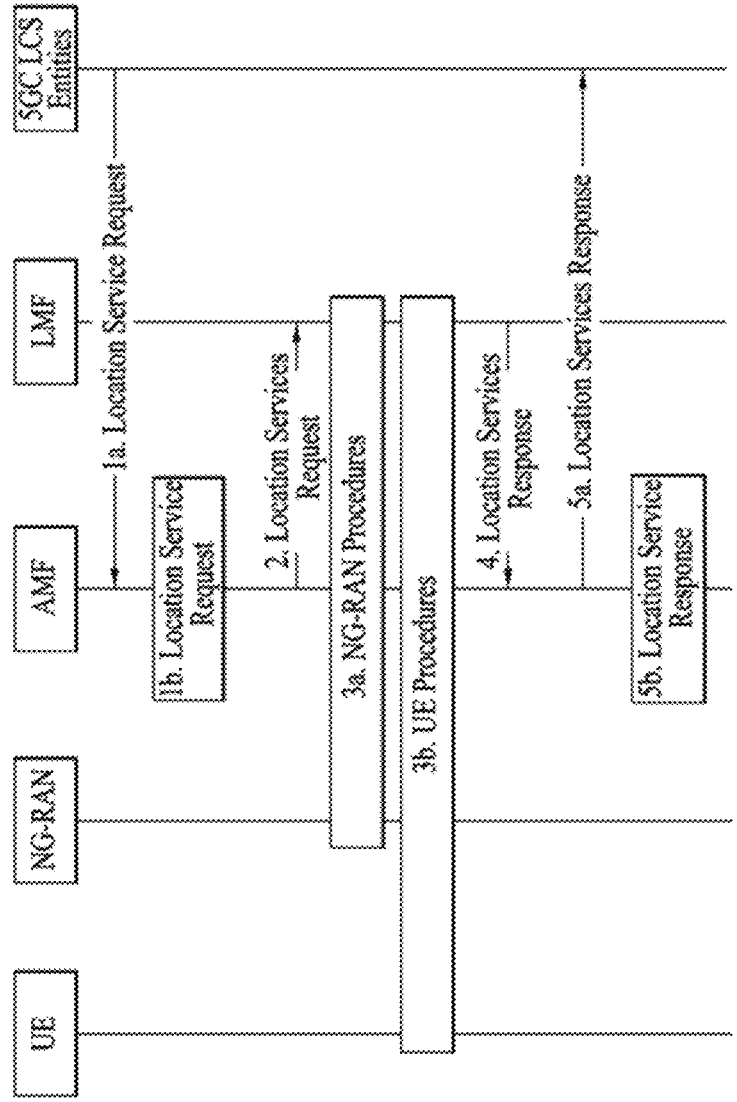
FIG. 8 illustrates exemplary implementation of a network for positioning a UE according to an embodiment of the present disclosure.

FIG. 8 illustrates exemplary implementation of a network for positioning a UE according to an embodiment of the present disclosure.

Upon receipt of a location service request when the UE is in a connection management—IDLE (CM-IDLE) state, the AMF may establish a signaling connection with the UE and request a network trigger service to assign a specific serving gNB or ng-eNB. This operation is not shown in FIG. 8. That is, FIG. 8 may be based on the assumption that the UE is in connected mode. However, the signaling connection may be released by the NG-RAN due to signaling and data deactivation during positioning.

Referring to FIG. 8, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

Figure 24:
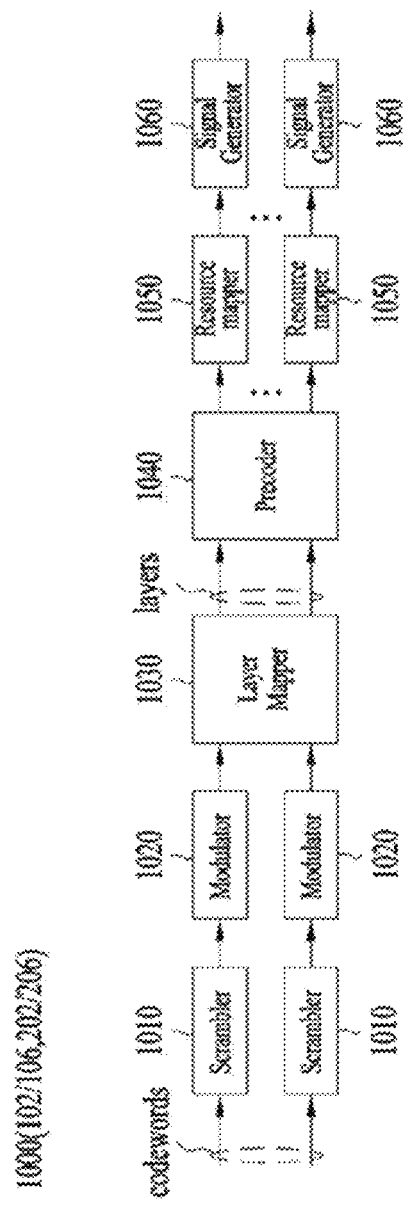

In step 4, the LMF may provide a location service response to the AMF. The location service response may include information indicating whether location estimation of the UE was successful and the location estimate of the UE. Then, when the procedure of FIG. 24 is initiated in step 1a, the AMF may deliver the location service response to the 5GC entity such as the GMLC. When the procedure of FIG. 24 is initiated in step 1b, the AMF may use the location service response to provide the location service related to an emergency call or the like.

Figure 9:
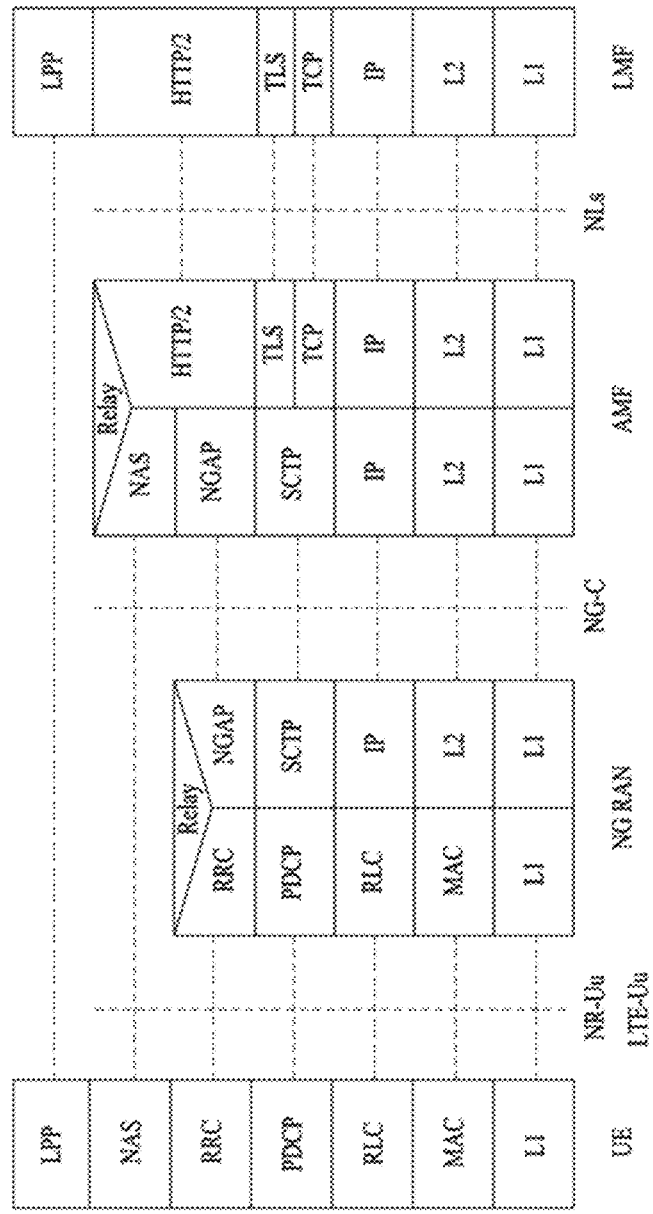
FIG. 9 illustrates exemplary protocol layers used to support LTE positioning protocol (LPP) message transmission between an LMF and a UE according to an embodiment of the present disclosure.

FIG. 9 illustrates exemplary protocol layers used to support LTE positioning protocol (LPP) message transmission between an LMF and a UE according to an embodiment of the present disclosure.

An LPP PDU may be transmitted in a NAS PDU between the AMF and the UE. Referring to FIG. 9, the LPP may be terminated between a target device (e.g., a UE in the control plane or a SUPL enabled terminal (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE in various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 10:
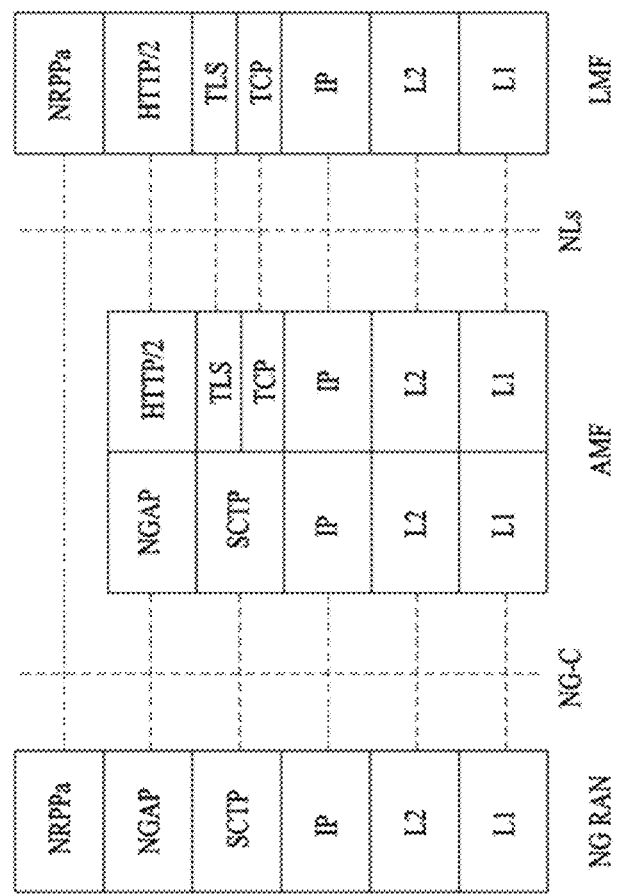
FIG. 10 illustrates exemplary protocol layers used to support NR positioning protocol A (NRPPa) PDU transmission between an LMF and an NG-RAN node according to an embodiment of the present disclosure.

FIG. 10 illustrates exemplary protocol layers used to support NR positioning protocol A (NRPPa) PDU transmission between an LMF and an NG-RAN node according to an embodiment of the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned in any of the above positioning methods, two or more positioning methods may be used to position the UE.

(1) Observed Time Difference Of Arrival (OTDOA)

Figure 11:
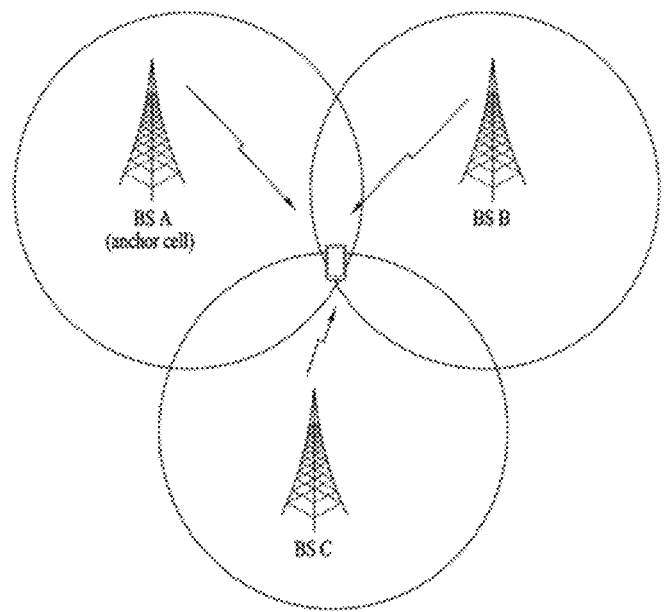
FIG. 11 is a diagram illustrating an OTDOA positioning method according to an embodiment of the present disclosure.

FIG. 11 is a diagram illustrating an OTDOA positioning method according to an embodiment of the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell, respectively. That is, the RSTD may be calculated based on a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

[Equation 1]

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

where c is the speed of light, {xt, yt} is the (unknown) coordinates of the target UE, {xi, yi} is the coordinates of a (known) TP, and {x1, y1} is the coordinates of a reference TP (or another TP). (Ti-T1) is a transmission time offset between the two TPs, which may be referred to as "real time difference" (RTD), and ni and n1 may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH Ec/Io E-UTRAN measurements: ng-eNB Rx-Tx time difference, timing advance (TADV), and angle of arrival (AoA)

TADVs may be classified into Type 1 and Type 2 as follows.

TADV Type 1=(ng-eNB $Rx$-$Tx$ time difference)+(UE E-UTRA $Rx$-$Tx$ time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (UL Time Difference Of Arrival)

A UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Embodiment 1—Groupcast Positioning Slot Structure

The present disclosure relates to a slot structure for performing groupcast positioning using sidelink by a user equipment (UE) in an NR-V2X system. Here, the groupcast positioning may be a method in which a positioning UE as a target of location measurement requests a neighbor candidate anchor node (AN) to provide information required for positioning and to participate in a positioning procedure and measures the location with the help of an AN group that finally accepts to participate in groupcast positioning.

Figure 12:
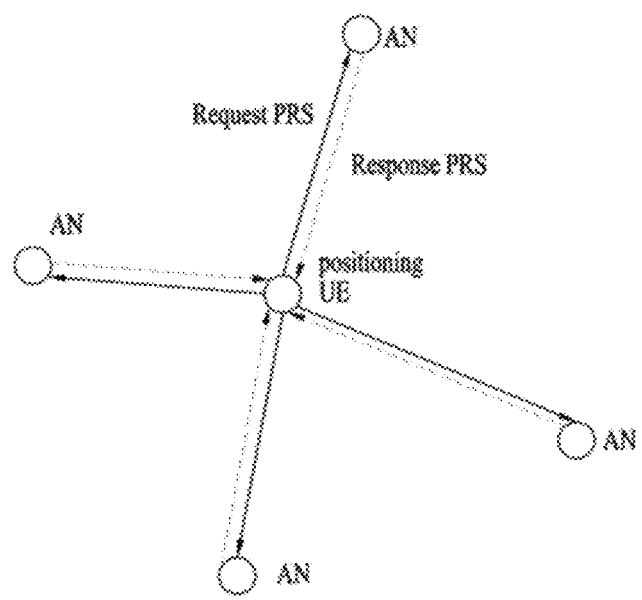
FIGS. 12 to 21 are diagrams for explaining embodiment(s).

FIG. 12 is a diagram for explaining a groupcast positioning operation proposed in the present disclosure.

Referring to FIG. 12, a positioning UE may transmit a request positioning reference signal (PRS) to ANs that participate in the groupcast positioning operation. That is, the positioning UE may request information required for location measurement by transmitting a reference signal (request PRS) having a specific pattern to an AN. In response thereto, the AN may transmit a response PRS to the positioning UE. The positioning UE may measure the location thereof in consideration of the request PRS and a transmission time and arrival time of the response PRS.

The present disclosure proposes various slot structures for transmitting a response PRS to a positioning UE by an AN in response to a request PRS transmitted to the AN from the positioning UE in order to measure Time of Arrival (ToA) between the UE and the AN that participates in positioning.

The present disclosure relates to a method of measuring the location of a UE through sidelink by the UE and the AN in an NR-V2X system. In particular, the present disclosure relates to a method in which the UE receives information required for positioning from the AN and performs positioning.

Here, the UE may be a mobile device, a V2X module, and an IoT device, and the AN may be an eNB and/or a UE. In this case, the eNB as an AN may include an eNB, a gNB, LTE-LAA, NR-U, a transmission point (TP), remote head control (RHC), and a gNB-type road-side unit (RSU) for providing fixed (or absolute) location information, and the UE as an AN may include a UE for providing location information with high reliability and a UE-type RSU for providing fixed location information.

Hereinafter, the problem of the conventional art related to the present disclosure will be described.

Positioning of a UE based on observed TDoA (OTDOA) of an NR system relates to a method in which a location server/LMF and/or an anchor node (AN) requests the UE to measure and then report RSTD information required for OTDOA positioning through a Uu interface, measures the location of the UE based on the received RSTD information, and then transfers location information to the UE again.

The positioning method based on the location server/LMF and/or the AN may cause a large delay until the UE finally receives the location information to degrade the reliability of information, and particularly, the physical delay generated in such a positioning operation may greatly degrade the reliability of information as the speed of the UE increases in the NR-V2X system. Thus, to overcome the above problem, the present disclosure considers an operation in which a UE directly performs positioning with the help of a neighbor AN group.

Hereinafter, proposal of the present disclosure will be described.

The present disclosure relates to a slot structure for groupcast positioning of a UE in a sidelink NR-V2X system and proposes the following various slot structures for transmitting a response PRS to a positioning UE by an AN in response to a request PRS transmitted to an AN group from the positioning UE (or a UE that performs positioning).

Groupcast Positioning Slot Structure-1:

The request PRS of the positioning UE may be transmitted through an NR-V2X slot and the response PRS of the AN group (or each AN) may be transmitted through a PRS slot. In this case, the PRS slot may allow PSCCH transmission containing scheduling information and PRS reservation information of the request PRS between positioning UEs and the response PRS between AN groups.

Groupcast Positioning Slot Structure-2:

Similarly to the groupcast positioning slot structure-1, the request PRS of the positioning UE may be transmitted through the NR-V2X slot, and the response PRS of the AN group (or each AN) may be transmitted through the PRS slot. In this case, the scheduling information and PRS reservation information of the request PRS between the positioning UEs and the response PRS between the AN groups may be transmitted through the PSCCH of the NR-V2X slot.

Groupcast Positioning Slot Structure-3:

Differently from the groupcast positioning slot structure-1/2, the request PRS of the positioning UE may be transmitted through the PRS slot, and the response PRS of the AN group may also be transmitted through the PRS slot. In this case, the PRS slot may allow PSCCH transmission containing the scheduling information and PRS reservation information of the request PRS between the positioning UEs and the response PRS between the AN groups.

Groupcast Positioning Slot Structure-4:

Similarly to the groupcast positioning slot structure-3, the request PRS of the positioning UE and the response PRS of the AN group may be transmitted through the PRS slot. In this case, the scheduling information and PRS reservation information of the request PRS between UEs and the response PRS between AN groups may be transmitted through the PSCCH of the NR-V2X slot.

Table 5 below shows scenarios of the aforementioned groupcast positioning slot structure.

TABLE 5

| Groupcast Positioning Slot Structure | request PRS | response PRS | PRS scheduling information |
|---|---|---|---|
| 1 | NR-V2X slot | PRS slot | PRS slot |
| 2 | NR-V2X slot | PRS slot | NR-V2X slot |
| 3 | PRS slot | PRS slot | PRS slot |
| 4 | PRS slot | PRS slot | NR-V2X slot |

Hereinafter, four groupcast positioning slot structures proposed for sidelink groupcast positioning in an NR-V2X system will be described. Here, the groupcast positioning may refer to a method in which a positioning UE as a target of location measurement requests a neighbor candidate AN to provide information required for positioning and to participate in a positioning procedure and measures the location with the help of an AN group that finally accepts to participate in groupcast positioning. The features of groupcast positioning operated in the proposed four groupcast slot structures will be described.

The AN group may include one or more ANs, and a candidate AN may refer to an eNB and/or a UE.

Each AN of the AN group may transmit SCI required for groupcast positioning of the UE, such as location information of an AN, accuracy of the location information of the AN, or positioning quality indicator (PQI) information for determining a quality of service (QoS) level, to the positioning UE through a PSCCH of an NR-V2X slot.

A ToA between the positioning UE and each AN in a groupcast positioning procedure may be measured using the request PRS transmitted to the AN from the positioning UE and the response PRS transmitted in response thereto to the positioning UE from the AN. In this case, the request PRS may be transmitted through an existing NR-V2X slot or may be transmitted through a newly inserted PRS slot. In contrast, the response PRS may be transmitted through the newly inserted PRS slot.

As the request PRS and the response PRS, a sounding reference signal (SRS) supported in an existing NR UL system may be considered, a PRS being used for NR positioning may be considered, or a newly designed PRS may be considered.

In order to minimize interference with an existing NR-V2X service, the newly inserted PRS slot in the NR-V2X system may be inserted into an NR-V2X slot array using time division multiple access (TDMA) as shown in FIGS. 13, 15, 17, and 19. NR-V2X service transmission in a PRS slot may not be allowed. As a result, the PRS slot and the NR-V2X slot may coexist without mutual interference. The PRS slot structure may vary depending on a groupcast slot structure and will be described below.

The positioning UE may transmit information related to scheduling and PRS reservation for PRSs transmitted from the positioning UE and the AN group to an AN group (or a neighbor positioning UE) through a PSCCH/PSSCH of the NR-V2X slot or a PSCCH/PSSCH of a newly inserted PRS slot.

PRS scheduling transmitted from the positioning UE may refer to an operation for minimizing collision between PRSs, which may occur when positioning UEs use the same PRS pattern when the plurality of UEs intend to perform groupcast positioning. In this case, the PRS pattern used in the positioning UEs may be determined through contention-based reservation between the positioning UEs and/or may be determined by a location server/LMF and/or an eNB and may be transferred to the UE.

PRS scheduling transmitted from the AN group may refer to an operation for minimizing collision between PRSs by ensuring orthogonality between PRS groups transmitted from each AN group when a plurality of UEs intend to perform groupcast positioning. In this case, the orthogonality between the AN group may be ensured using the orthogonality of time division multiplexing (TDM) or a PRS pattern. A time used for PRS transmission by each AN group may be determined through contention-based reservation between positioning UEs or may be determined by a location server/LMF and/or an eNB and may be transferred to a UE. A PRS pattern used by each AN of an AN group may be determined by the UE or may be determined by the location server/LMF and/or the eNB and may be transferred to the UE.

PRS reservation may refer to reservation for the aforementioned request PRS scheduling of a positioning UE and response PRS scheduling of an AN group. For example, the PRS reservation may be information indicating how long (or how many times) the request PRS and response PRS patterns used by the positioning UE are valid and may be randomly selected by the positioning UE or may be determined by a location server/LMF and/or an eNB and may be transferred to the UE. Thus, the AN group may participate in groupcast positioning during a PRS reservation time (or number of times).

In a groupcast positioning procedure, each AN may transmit data of a time (Tx-Rx time difference: TRTD) required to receive a ToA value measured using the request PRS received from the positioning UE or the request PRS from the positioning UE and then to transmit the response PRS to the positioning UE in response thereto, through a PSSCH of an NR-V2X slot.

[Embodiment 1-1]: Groupcast Positioning Slot Structure-1

A first groupcast positioning slot structure-1 for effectively performing sidelink groupcast positioning in an NR-V2X system will be described.

Figure 14:
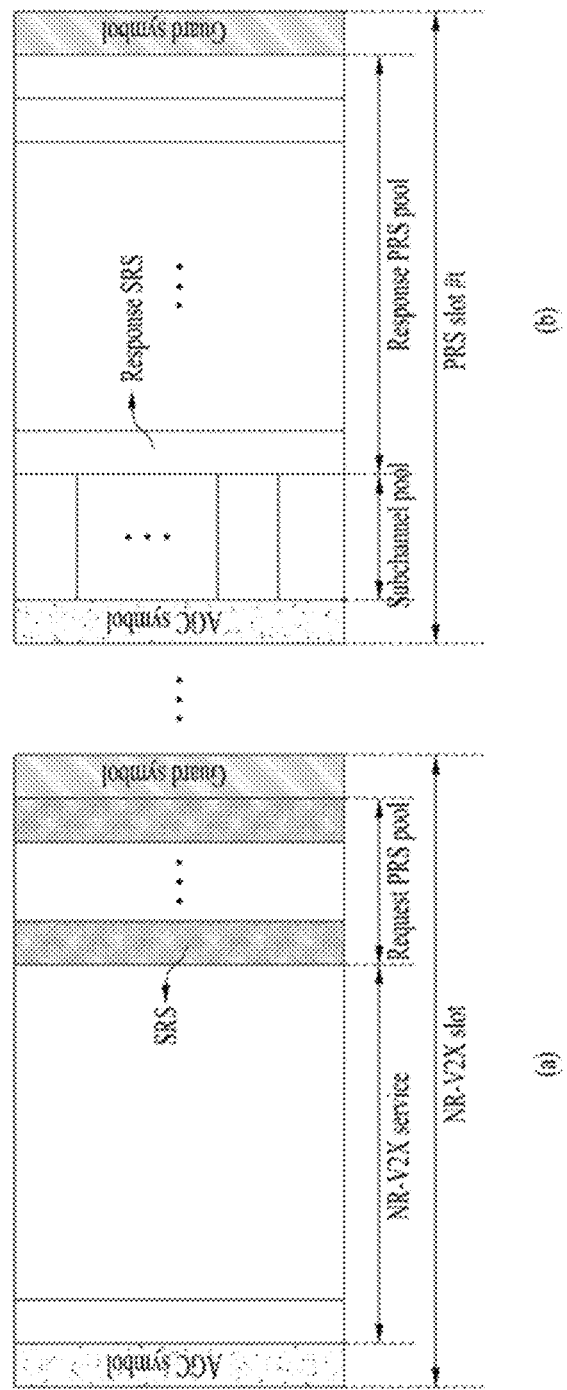

FIG. 13 illustrates PRS slot insertion of the groupcast positioning slot structure-1, and FIG. 14 illustrates the groupcast positioning slot structure-1.

Referring to FIGS. 13 and 14, T PRS slots may be inserted into an NR-V2X slot structure. A request PRS may be transmitted in the NR-V2X slot and a response PRS may be transmitted in a PRS slot. In addition, SCI for positioning may be transmitted in the PRS slot. The PRS slot may include a plurality of subchannel pools to transmit the SCI.

Hereinafter, the main feature of the groupcast positioning slot structure-1 will be described.

The positioning UE may transmit the request PRS using a request PRS pool resource of the NR-V2X slot.

The AN group may transmit the response PRS using a response PRS pool resource of the PRS slot in response to the request PRS received from the positioning UE.

The positioning UE may transmit a PSCCH and/or a PSSCH including scheduling information of the request PRS, scheduling information of the response PRS of the AN group, and information related to request/response PRS reservation through a subchannel pool of a newly inserted PRS slot.

Each AN of the AN group may transmit a measured ToA or TRTD value through a PSSCH of the NR-V2X slot.

Referring to FIG. 13, PRS slots may be arranged and used in various ways according to a groupcast positioning operation and NR-V2X system operation method. For example, as shown in FIG. 13, the plurality of PRS slots may be continuously (PRS slot-0 to PRS slot-(T-1)) arranged and used. Here, T may be the number of continuous PRS slots. In this case, the respective PRS slots may repeatedly have the same PSCCH and PRS information and may have different PSCCHs and PRS information. The PRS slots may be periodically or aperiodically arranged and used.

FIG. 14 illustrates a groupcast positioning slot structure-1. A PRS slot operation for a response PRS and a subchannel for PSCCH and/or PSSCH transmission and an NR-V2X slot operation for a request PRS will be described.

Hereinafter, the PRS slot operation for the subchannel and the response PRS will be described.

Referring to FIG. 14(b), the PRS slot may include a resource for a subchannel pool for PSCCH and/or PSSCH transmission based on a TDMA operation and a resource for a response PRS pool. The PRS slot may basically include a subchannel, a response PRS, auto-gain control (AGC) symbol, and a guard symbol.

Subchannel: A subchannel including a plurality of RBs may be positioned before a response PRS pool or after an AGC symbol. In this case, the size and number of subchannels used in the PRS slot may be predefined or may be determined (configured) by a location server/LMF and/or an AN. In FIG. 14(b), each subchannel in the PRB slot may include a PSCCH/PSSCH and a demodulation reference symbol (DMRS), and the PSCCH/PSSCH may be transmitted using one or more OFDM symbols. Each subchannel may be predefined or may be determined by a location server/LMF and/or an AN. A DMRS used to estimate channel information required to demodulate a PSCCH may include one or more OFDM symbols and may be disposed at an arbitrary location including a first symbol of a subchannel. The number of OFDM symbols for such a DMRS or the location of the DMRS may be predefined or may be determined by a location server/LMF and/or an eNB.

Response PRS: The response PRS may be positioned after a subchannel pool. A frequency bandwidth for PRS transmission may be allocation through a plurality of RB configurations and may be equal to or less than the maximum entire available frequency bandwidth allocated to the system. FIG. 14 illustrates an embodiment in which in which one response PRS is transmitted in an entire available frequency bandwidth through a PRS slot.

Guard symbol: The guard symbol may be located at the end of the PRS slot and may or may not be inserted as a symbol for ensuring a time required to change a sidelink Time-Division Duplex (TDD) mode to Up-link (UL) from Down-link (DL). When a plurality of PRS slots are consecutively arranged, the guard symbol may be inserted at the end of every PRS slot or only at the end of the last PRS slot. Whether the guard symbol is inserted and a position at which the guard symbol is inserted may be predefined or may be determined by a location server/LMF and/or an eNB.

AGC symbol: The AGC symbol may be positioned at the front of the PRS slot and may or may not be inserted as a symbol for ensuring a time required for an AGC operation. When a plurality of PRS slots is consecutively arranged, the AGC symbol may be inserted at the beginning of every PRS slot or only at the beginning of the last PRS slot. Whether the AGC symbol is inserted and a position at which the AGC symbol is inserted may be predefined or may be determined by a location server/LMF and/or an eNB.

Each subchannel may include information related to one positioning UE and an AN group that participates in groupcast positioning.

The number of OFDM symbols to be used to transmit the response PRS by each AN group in a response PRS pool and the number of AN groups for simultaneous transmission using different response PRS patterns may be predefined or may be determined by a location server/LMF and/or an eNB and may be transferred to a UE. Here, when each AN group uses a plurality of OFDM symbols, 1) response PRSs having the same pattern may be repeatedly transmitted as many as the number of OFDM symbols or 2) a plurality of OFDM symbols may be used because the size of the AN group is larger than the number of PRS patterns to be simultaneously transmitted in one OFDM symbol.

Hereinafter, a PRS slot operation for a request PRS will be described.

Referring to FIG. 14(a), an NR-V2X slot may include an NR-V2X service and a resource for a request PRS pool based on a TDMA operation. In particular, FIG. 14(a) illustrates an embodiment in which the request PRS is transmitted using a resource pool to be allocated for SRS transmission in an existing NR UL system.

The request PRS pool may be operated in consideration of the location of a PRS slot in order to minimize impact on existing NR-V2X service throughput. That is, the request PRS pool may be included and operated in an NR-V2X slot that is directly adjacent to the PRS slot or is located in a predetermined slot duration based on the PRS slot rather than being included and operated every NR-V2X slot. In this case, the number and location of NR-V2X slots including the request PRS pool may be predefined or may be determined by a location server/LMF and/or an eNB and may be transferred to the UE.

The number of OFDM symbols to be used to transmit the request PRS by each positioning UE in the request PRS pool, a request PRS pattern to be simultaneously transmitted through the same OFDM symbol, the number of the patterns, and the number of positioning UEs or may be determined by a location server/LMF and/or an eNB and may be transferred to the UE. Here, when each positioning UE uses a plurality of OFDM symbols, request PRSs having the same pattern may be repeatedly transmitted as many as the number of OFDM symbols.

Hereinafter, a main positioning operation of a UE based on the groupcast positioning slot structure-1 will be described.

The positioning UE may transmit a request PRS to an AN group and may record a transmission time.

Each AN of the AN group may record a reception time of the request PRS received from the positioning UE.

Each AN of the AN group may transmit the response PRS to the positioning UE and may record a transmission time.

The positioning UE may record a reception time of the response PRS received from the AN group and may receive a ToA value or TRTD value measured by each AN of the AN group through a PSSCH of an NR-V2X slot.

The positioning UE may perform groupcast positioning using information such as the transmission time of the request PRS in the positioning UE, the reception time of the request PRS in each AN, the transmission time of the response PRS in each AN, and the reception time of the response PRS in the positioning UE.

[Embodiment 1-2]: Groupcast Slot Structure-2

Hereinafter, a second groupcast positioning slot structure-2 similar to the aforementioned groupcast positioning slot structure-1 will be described.

Figure 15:
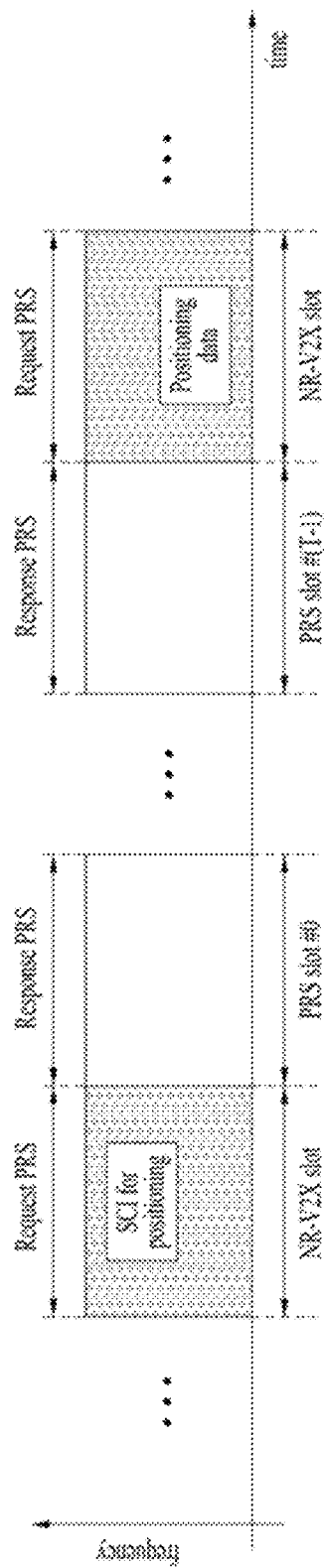
Figure 16:
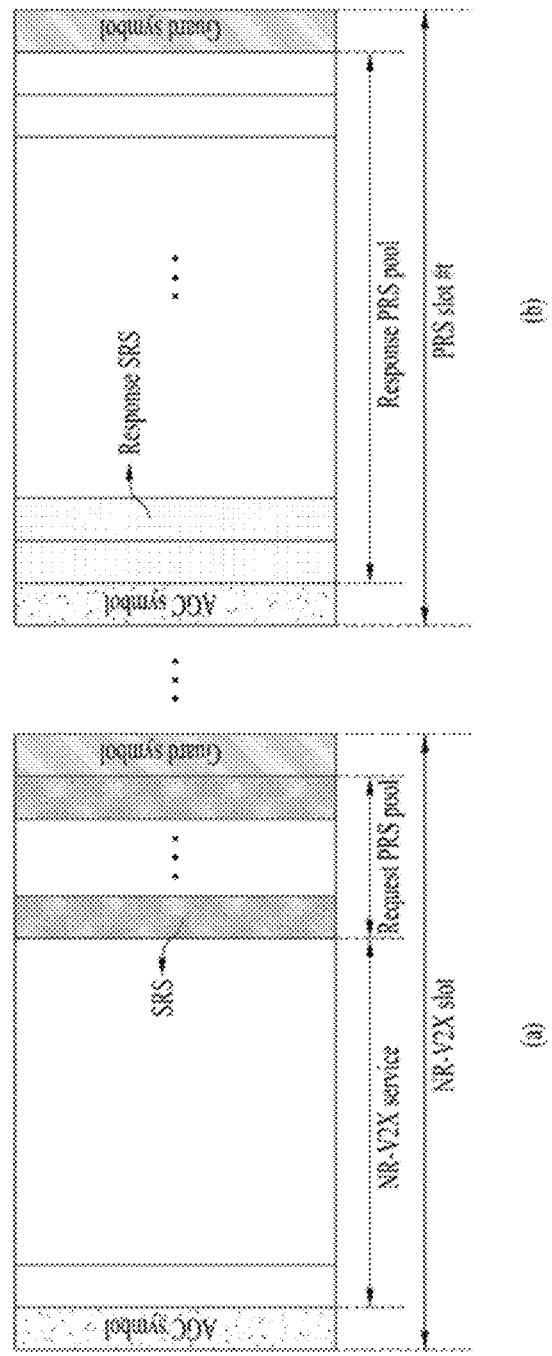

FIG. 15 illustrates PRS insertion of the groupcast positioning slot structure-2, and FIG. 16 illustrates the groupcast positioning slot structure-2.

Referring to FIGS. 15 and 16, T PRS slots may be inserted into an NR-V2X slot structure. A request PRS may be transmitted in the NR-V2X slot and a response PRS may be transmitted in a PRS slot. In addition, SCI for positioning may be transmitted in the NR-V2X slot.

Hereinafter, the main feature of the groupcast positioning slot structure-2 will be described.

The positioning UE may transmit the request PRS using a request PRS pool resource of the NR-V2X slot.

The AN group may transmit the response PRS using a response PRS pool resource of the PRS slot in response to the request PRS received from the positioning UE.

The positioning UE may transmit scheduling information for the request PRS, scheduling information for the response PRS of an AN, and information related to PRS reservation through a PSCCH and/or a PSSCH of the NR-V2X slot.

Each AN of the AN group may transmit a measured ToA or TRTD value through a PSSCH of the NR-V2X slot.

The same operation as the main positioning operation of the UE based on the groupcast positioning slot structure-1 may be applied to a main positioning operation of the UE based on the groupcast positioning slot structure-2.

[Embodiment 1-3]: Groupcast Slot Structure-3

Hereinafter, the groupcast positioning slot structure-3 for transmitting the request PRS through a PRS slot by a positioning UE differently from the aforementioned groupcast positioning slot structure-1/2 will be proposed.

Figure 17:
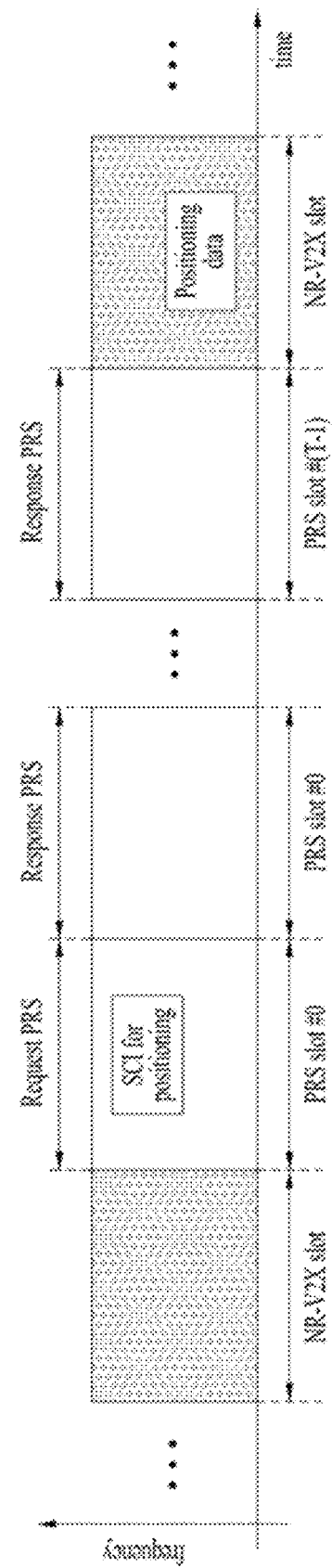
Figure 18:
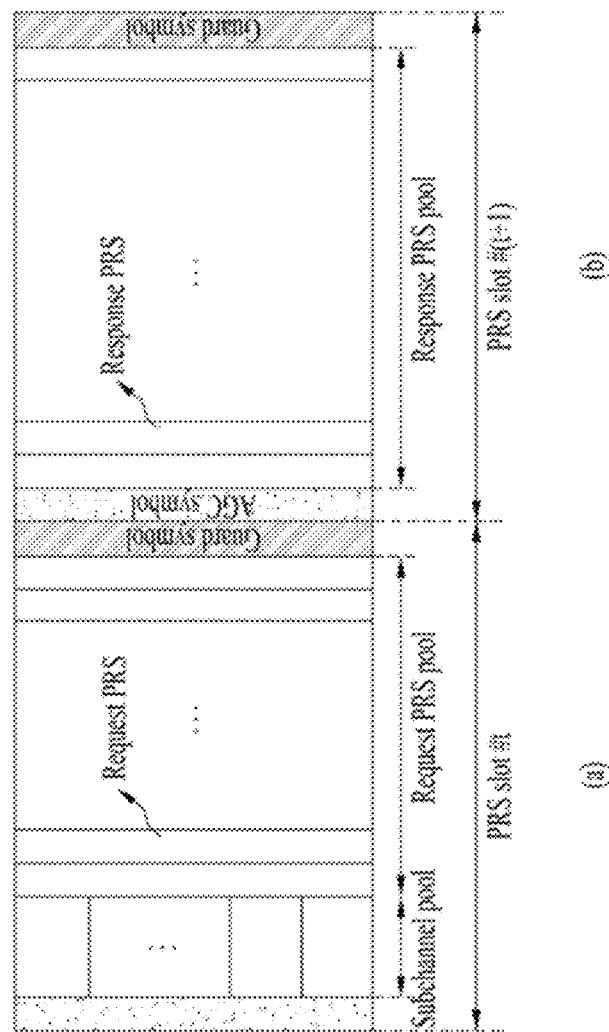

FIG. 17 illustrates PRS insertion of the groupcast positioning slot structure-3, and FIG. 18 illustrates the groupcast positioning slot structure-3.

Referring to FIGS. 17 and 18, T PRS slots may be inserted into an NR-V2X slot structure. A request PRS and a response PRS may be transmitted in the PRS slot. In addition, SCI for positioning may be transmitted in the PRS slot. The PRS slot may include a plurality of subchannel pools to transmit the SCI.

Hereinafter, the main feature of the groupcast positioning slot structure-3 will be described.

The positioning UE may transmit the request PRS using a request PRS pool resource of the PRS slot.

The AN group may transmit the response PRS using a response PRS pool resource of the PRS slot in response to the request PRS received from the positioning UE.

The positioning UE may transmit a PSCCH and/or a PSSCH including scheduling information of the request PRS, scheduling information of the response PRS of the AN, and information related to PRS reservation through a subchannel pool of a newly inserted PRS slot.

Each AN of the AN group may transmit a measured ToA or TRTD value through a PSSCH of the NR-V2X slot.

In FIG. 17, the request PRS and the response PRS may be transmitted through continuously adjacent PRS slots, and in this case, the number of PRS slots for request PRS transmission and the number of PRS slots for response PRS transmission may be at least one or more. The number of the PRS slots for request PRS transmission and the number of the PRS slots for response PRS transmission may be predefined according to a groupcast positioning operation and NR-V2X system operation method or may be determined by a location server/LMF and/or an AN. The continuously adjacent PRS slots may be periodically or aperiodically arranged and used.

FIG. 18 illustrates a groupcast positioning slot structure-3, and a PRS slot operation for a request PRS and a slot operation for a response PRS will be described below.

PRS Slot Operation for Request PRS

Referring to FIG. 18(a), the PRS slot may include a resource for a subchannel pool for PSCCH and/or PSSCH transmission and a resource for a response PRS pool based on a TDMA operation. The PRS slot may include a subchannel, a request PRS, an AGC symbol, a guard symbol, or the like, and the subchannel may be located before the request PRS pool or may be located after the AGC symbol. The configuration of the subchannel and the features of the AGC symbol and the guard symbol may be understood with reference to FIG. 14.

Each subchannel may include information related to one positioning UE and an AN group that participates in groupcast positioning.

The number of OFDM symbols to be used to transmit the request PRS by each positioning UE in a request PRS pool and the number of positioning UEs for simultaneous transmission using different request PRS patterns may be predefined or may be determined by a location server/LMF and/or an eNB and may be transferred to the UE.

PRS Slot Operation for Response PRS

Referring to FIG. 18(b), the number of OFDM symbols to be used to transmit the response PRS by each AN group in a response PRS pool and the number of AN groups for simultaneous transmission using different response PRS patterns may be predefined or may be determined by a location server/LMF and/or an eNB and may be transferred to the UE.

The same operation as the main positioning operation of the UE based on the groupcast positioning slot structure-1 may be applied to a main positioning operation of the groupcast positioning slot structure-3.

[Embodiment 1-4]: Groupcast Slot Structure-4

Figure 19:
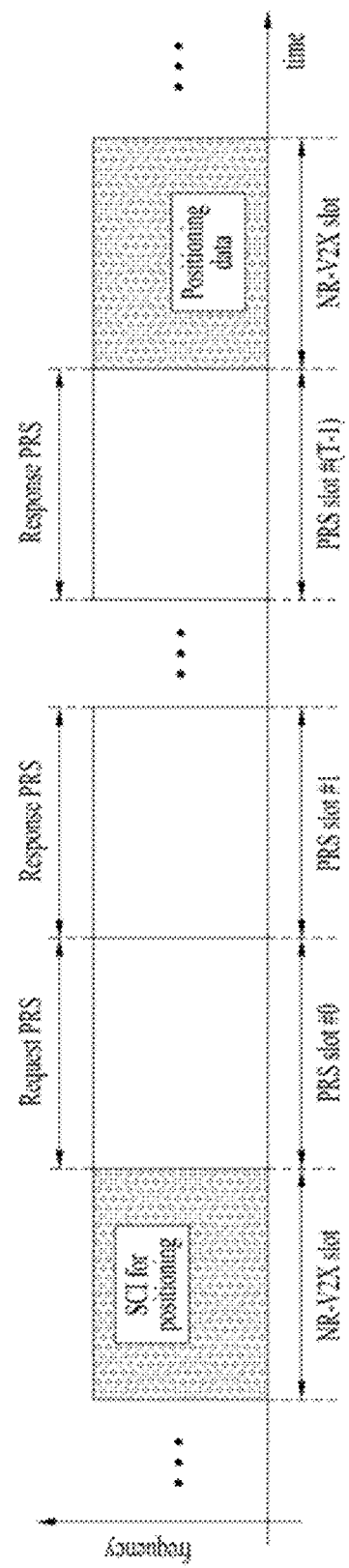

Hereinafter, a fourth groupcast positioning slot structure-4 similar to the aforementioned groupcast positioning slot structure-3 will be described. FIG. 19 illustrates PRS insertion of the groupcast positioning slot structure-4, and FIG. 20 illustrates the groupcast positioning slot structure-4.

Figure 20:
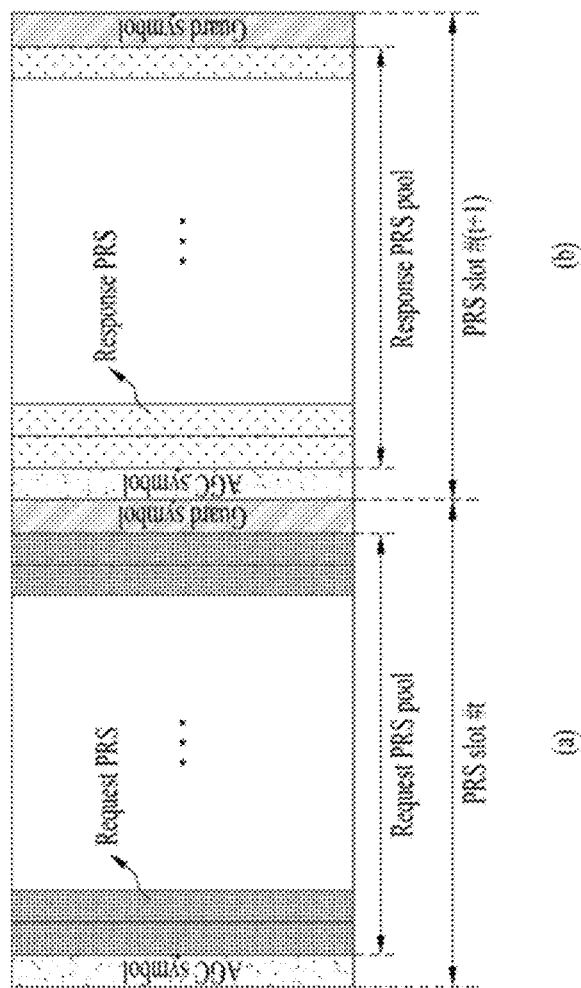

Referring to FIGS. 19 and 20, T PRS slots may be inserted into an NR-V2X slot structure. A request PRS and a response PRS may be transmitted in the PRS slot. In addition, SCI for positioning may be transmitted in the NR-V2X slot.

Hereinafter, the main feature of the groupcast positioning slot structure-4 will be described.

The positioning UE may transmit the request PRS using a request PRS pool resource of the PRS slot.

The AN group may transmit the response PRS using a response PRS pool resource of the PRS slot in response to the request PRS received from the positioning UE.

The positioning UE may transmit scheduling information for the request PRS, scheduling information for the response PRS of an AN, and information related to PRS reservation through a PSCCH and/or a PSSCH of the NR-V2X slot.

Each AN of the AN group may transmit a measured ToA or TRTD value through a PSSCH of the NR-V2X slot.

A main positioning operation of the UE based on the groupcast positioning slot structure-4 may be the same as the main positioning operation of the UE based on the groupcast positioning slot structure-1.

Hereinafter, an effect of embodiments of the present disclosure will be described.

The present disclosure relates to a slot structure for directly performing positioning with a neighbor AN group using sidelink without the help of a location server/LMF and/or an eNB by a UE, and may propose four groupcast positioning slot structures for transmitting a request PRS to an AN group by a positioning UE that intends to perform positioning and, in response thereto, transmitting a response PRS to the positioning UE by the AN group. The groupcast positioning slot structure according to the present disclosure may provide the following advantages.

A method of performing a positioning procedure by a UE may have high speed compared with a conventional location measuring method of a UE through a location server/LMF and an eNB.

The groupcast positioning slot structure-1/2 may use an SRS transmission resource structure of an existing NR-V2X slot for request PRS transmission of a positioning UE and may insert an independent PRS slot for response PRS transmission of an AN group, and thus may be capable of performing a groupcast positioning operation without causing interference to an existing NR-V2X slot and service operation.

The groupcast positioning slot structure-3/4 may be capable of performing a groupcast positioning operation without causing interference to the existing NR-V2X slot and service operation through independent PRS slot insertion for request PRS transmission of the positioning UE and response PRS transmission of the AN group.

The groupcast positioning slot structure-1/3 may add a PSCCH for transmitting scheduling information for a PRS related to the positioning UE, scheduling information for a PRS related to the AN group, and information related to PRS reservation to a PRS slot, thereby reducing the amount of signaling overhead for a PRS operation related to groupcast positioning. In addition, the efficiency of a PRS reservation procedure required in the groupcast positioning procedure may be increased.

Embodiment 2—Groupcast Positioning Procedure

The present disclosure relates to a procedure for performing groupcast positioning using sidelink by a UE in an NR-V2X system. Here, the groupcast positioning may refer to a method in which a positioning UE as a target of location measurement requests a neighbor candidate anchor node (AN) to provide information required for positioning and to participate in a positioning procedure and measures the location with the help of an AN group that finally accepts to participate in groupcast positioning. In particular, the present disclosure will state a groupcast positioning procedure in consideration of various slot structures for transmitting a request positioning reference signal (PRS) to an AN by a positioning UE and, in response thereto, transmitting a response PRS to the positioning UE by the AN in order to measure a time of arrival (ToA) between the positioning UE and an An that finally accepts to participate in positioning.

The present disclosure relates to a method of measuring the location of a UE through sidelink between the UE and an An in an NR-V2X system. In particular, the present disclosure relates to a method of receiving information required for positioning from an An by a UE and performing positioning. Here, the UE may be a mobile device, a V2X module, and an IoT device, and the AN may be an eNB and/or a UE. In this case, the eNB as an AN may include an eNB, a gNB, LTE-LAA, NR-U, a transmission point (TP), remote head control (RHC), and a gNB-type road-side unit (RSU) for providing fixed (or absolute) location information, and the UE as an AN may include a UE for providing location information with high reliability and a UE-type RSU for providing fixed location information.

A description with the description of the groupcast positioning slot structure described in Embodiment 1 may be applied to Embodiment 2.

Hereinafter, the problem of the conventional art related to the present disclosure will be described.

Positioning of a UE based on observed TDoA (OTDOA) of an NR system relates to a method in which a location server/LMF and/or an anchor node (AN) requests the UE to measure and then report RSTD information required for groupcast positioning through a Uu interface, measures the location of the UE based on the received RSTD, and then transfers location information to the UE again. The positioning method based on a location server/LMF and/or an AN may cause a large delay until the UE finally receives location information, thereby reducing the reliability of information. In particular, physical delay caused in the positioning operation may greatly reduce the reliability of information as the speed of the UE increases in the NR-V2X system. Thus, in order to overcome the above problem, the present disclosure considers an operation of directly performing positioning by the UE with the help of a neighbor AN group.

Hereinafter, proposal of the present disclosure will be described.

The present disclosure relaters to a procedure for performing groupcast positioning of a UE in a sidelink NR-V2X system and will state the procedure in consideration of the following various slot structures for transmitting a request PRS to an AN group by a positioning UE (or a UE that performs positioning) and, in response thereto, transmitting a response PRS to the positioning UE by the AN group.

Groupcast Positioning Slot Structure-1:

Referring to FIG. 14, a request PRS of the positioning UE may be transmitted through an NR-V2X slot, and a response PRS of an AN group (or each AN) may be transmitted through a PRS slot. In this case, the PRS slot may allow PSCCH transmission including scheduling information and PRS reservation information for the request PRS between positioning UEs and the response PRS between AN groups.

Groupcast Positioning Slot Structure-2:

Referring to FIG. 16, similarly to the groupcast positioning slot structure-1, the request PRS of the positioning UE may be transmitted through the NR-V2X slot and the response PRS of the AN group may be transmitted through the PRS slot. In this case, scheduling information and PRS reservation information for the request PRS between the positioning UEs and the response PRS between the AN groups may be transmitted through a PSCCH of the NR-V2X slot.

Groupcast Positioning Slot Structure-3:

Referring to FIG. 18, differently from the groupcast positioning slot structure-1/2, the request PRS of the positioning UE may be transmitted through the PRS slot, and the response PRS of the AN group may also be transmitted through the PRS slot. In this case, the PRS slot may allow PSCCH transmission including the scheduling information and the PRS reservation information for the request PRS between the positioning UEs and the response PRS between the AN groups.

Groupcast Positioning Slot Structure-4:

Referring to FIG. 20, similarly to the groupcast positioning slot structure-3, the request PRS of the positioning UE and the response PRS of the AN group may be transmitted through the PRS slot, and in this case, the scheduling information and the PRS reservation information for the request PRS between UEs and the response PRS between AN groups may be transmitted through a PSCCH of the NR-V2X slot.

Hereinafter, a procedure for performing sidelink groupcast positioning with respect to four groupcast positioning slot structures will be proposed. Here, the groupcast positioning may refer to a method in which a positioning UE as a target of location measurement requests a neighbor candidate AN to provide information required for positioning and to participate in a positioning procedure and measures the location with the help of an AN group that finally accepts to participate in groupcast positioning.

[Embodiment 2-1]: Groupcast Positioning Procedure in Consideration of Groupcast Slot Structure-1

Prior to a description of a procedure for performing sidelink groupcast positioning, the main feature of the groupcast positioning slot structure-1 will be described.

FIG. 14 illustrates the groupcast positioning slot structure-1. The main structural feature and operation method related to a groupcast positioning operation will be described below.

Feature and Operation Method of Groupcast Positioning Slot Structure-1:

The positioning UE may transmit a request PRS using a request PRS pool resource of the NR-V2X slot. In this case, the NR-V2X slot may include an NR-V2X service and a request PRS pool, and the request PRS pool resource may be configured using an SRS pool resource of existing NR UL. In addition, the request PRS pool may be included and operated in an NR-V2X slot that is directly adjacent to the PRS slot or is located in a predetermined slot duration based on the PRS slot.

The AN group may transmit the response PRS using the response PRS pool resource of the PRS slot in response to the request PRS received from the positioning UE. In this case, the PRS slot may be a slot inserted into an NR-V2X system and may include a subchannel pool and a response PRS pool. Here, the subchannel may be located before the response PRS pool and may include a plurality of RBs. A frequency bandwidth of the response PRS may be allocated through a plurality of RB configurations, and FIG. 14 illustrates an embodiment of transmitting one response PRS through an entire available frequency bandwidth.

The positioning UE may transmit a PSCCH and/or a PSSCH including scheduling information for the request PRS, scheduling information for the response PRS related to the AN group, and information related to request/response PRS reservation through a subchannel pool of the PRS slot. In this case, each subchannel may include information related to one positioning UE and an AN group that participates in groupcast positioning.

Each An of the AN group may transmit a measured time of arrival (ToA) value or Tx-Rx time difference (TRTD) value through a PSSCH of the NR-V2X slot.

Hereinafter, a procedure for performing sidelink groupcast positioning using the aforementioned groupcast positioning slot structure-1 will be described.

[STEP 1-0]:

This is a description of a method of acquiring and collecting 1) groupcast positioning operation-related information, 2) NR-V2X slot structure information for request PRS transmission, and 3) PRS slot structure information for response PRS transmission, which are required to perform/participate in a groupcast positioning operation by a positioning UE that intends to perform sidelink positioning and an AN eNB and/or an AN UE that function as an AN. First, the groupcast positioning operation-related information, the NR-V2X slot structure information, and the PRS slot structure information will be described.

Groupcast Positioning Operation-Related Information

Maximum number of ANs that are capable of participating in groupcast positioning
Frequency bandwidth (or the number of RBs) allocated for transmission of request PRS and response PRS
Whether to support inter-frequency groupcast
Whether to support 3D location information of AN: Support default 2D location information
Request PRS and response PRS type: PRS for ToA measurement, e.g., SRS or an arbitrary PRS
Request PRS and response PRS pattern (or PRS ID): PRS comb-type information: PRS frequency offset (frequency offset) information
PRS cyclic-shift information
Number of request PRS and response PRS symbols: Number of OFDM symbols used for PRS
PRS symbol location: location of OFDM symbol for transmitting PRS NR-V2X Slot Structure Information Location and number of NR-V2X slot including request PRS pool
Location or duration of request PRS pool in NR-V2X slot: location of OFDM symbol at which request PRS transmission starts
Pattern and number of request PRSs to be simultaneously transmitted through the same OFDM symbol
Number of OFDM symbols to be used for request PRS transmission by positioning UE PRS Slot Structure Information Number of PRS slots: Number of continuously arranged PRS slots
PRS slot period: Time interval by which PRS slots are spaced or number of spaced slots
PRS slot offset: Time interval by which direct frame number (DFN)=0 and first PRS slot or number of spaced slots in periodically transmitted PRS slot structure
Number of subchannels in PRS slot: Maximum number of positioning UEs to be supported by one PRS slot
Pattern and number of request PRSs to be simultaneously transmitted through the same OFDM symbol
Number of OFDM symbols to be used for response PRS transmission by AN group First, the case in which a UE exists within coverage of a location server/LMF and/or an eNB may be considered. The aforementioned information related to the NR-V2X slot structure, the PRS slot structure, and the groupcast positioning operation may be NR-V2X system configuration, may be provided through MIB/SIB of a PSBCH transmitted through a NR-V2X slot, and may be periodically or aperiodically changed by a location server/LMF and/or an eNB. Thus, a UE that intends to perform sidelink groupcast positioning and an eNB and/or a UE that function as an AN may acquire configuration information required for sidelink groupcast positioning by receiving the PSBCH transmitted through the NR-V2X slot.

Second, the case in which a UE exists outside a location server/LMF and/or an eNB or needs to perform groupcast positioning without the help of the location server/LMF and/or the eNB may be considered. In this environment, the information related to the PRS slot structure and the groupcast positioning may be provided by predefining a default groupcast positioning operation. Thus, a UE that intends to perform sidelink groupcast positioning and an eNB and/or a UE that function as an AN may acquire configuration information required for sidelink groupcast positioning using a parameter related to a pre-stored or stored default PRS slot structure and groupcast positioning operation.

STEP 1-1

A next step may be a first step of sidelink groupcast positioning and may be a procedure in which a positioning UE that intends to perform groupcast positioning requests a neighbor eNB and/or a UE to participate in a groupcast positioning procedure as an AN through transmission of a request message for positioning. In this case, the positioning UE may transmit minimal information for identifying an AN, such as a location based service (LBS)-related service ID and/or a minimum required positioning quality indicator (PQI) for LBS or a PQI threshold, which is to be considered. In this case, when the PQI information is not transmitted, a predefined default PQI may be applied.

In this case, the PQI may be measured as a value or a level for determining accuracy of the location information of the AN, or a positioning quality indicator (PQI) level. In this case, a threshold or reference level for determining whether the PQI is satisfied may be predefined according to an LBS (or irrespective of the LBS) or may be determined by a location server/LMF and/or an eNB and may be transferred to the eNB and the UE.

The positioning UE may request participation in groupcast positioning through a high layer sidelink positioning protocol (SPP) message on a control plane or a user plane or may signal participation in groupcast positioning through a PSCCH and/or a PSSCH, PC5 RRC, or a MAC CE.

[STEP 1-1] may be a procedure performed when the positioning UE does not have prior information of a neighbor candidate AN. In contrast, when the positioning UE previously has positioning-related connection with a neighbor eNB and/or a UE through groupcast communication and unicast communication, a final AN selection procedure of [STEP1-4] described below may be immediately performed.

STEP 1-2

A next step may be a procedure of determining whether an eNB and/or a UE that receives a groupcast positioning participation request message from the positioning UE in [STEP 1-1] participates in positioning as a candidate AN. In this case, the candidate AN may be identified and determined by the eNB and/or the UE that receive the message autonomously (or by a location server/LMF and/or an eNB). The candidate AN may receive the request PRS from the UE through the NR-V2X slot and, in response thereto, may transmit the response PRS through the PRS slot. A final AN may refer to an eNB and a UE that is finally selected by the positioning UE among candidate ANs. A final AN selection method will be described in [STEP 1-4]. Hereinafter, a procedure and method of determining whether an eNB and/or a UE participates in groupcast positioning as a candidate AN will be described.

The eNB and/or the UE may participate in the positioning procedure as a candidate AN when a PQI of the eNB and/or the UE is greater than a request PQI threshold received from the positioning UE or is higher than a request PQI level. In contrast, the eNB and/or the UE may not participate in the positioning procedure as a candidate AN when the PQI of the eNB and/or the UE is smaller than the request PQI threshold or is lower than the request PQI level.

According to an embodiment, the eNB and/or the UE may measure reference signal received power (RSRP) of a received demodulation reference signal (DMRS) or may measure a received signal strength indicator (RSSI) for a PSCCH and a PSCCH, may participate in the positioning procedure as a candidate AN when link quality is equal to or greater than a specific threshold, and may not participate in the positioning procedure as the candidate AN when the link quality is equal to or less than the specific threshold. In this case, the threshold or the reference level may be predefined according to an LBS (or irrespective of the LBS) or may be determined by a location server/LMF and/or an eNB and may be transferred to the eNB and the UE.

According to an embodiment, the eNB and/or the UE may measure a channel utilization ratio thereof using a congestion level of a transmission level, and then may participate in the positioning procedure as the candidate AN when the congestion level is equal to or greater than a specific threshold, and may not participate in the positioning procedure as the candidate AN when the congestion level is equal to or less than the specific threshold. In this case, the threshold or the reference level may be predefined according to an LBS (or irrespective of the LBS) or may be determined by a location server/LMF and/or an eNB and may be transferred to the eNB and the UE.

According to an embodiment, the eNB and/or the UE may participate in the positioning procedure as the AN according to determination of the location server/LMF and/or the eNB. For example, with regard to an eNB and/or a UE having fixed location information, when receiving a message from a request UE, the eNB and/or the UE may participate in the positioning procedure as the AN. In contrast, irrespective of message reception, the eNB and/or the UE may not participate in the positioning procedure as the AN.

STEP 1-3

A next step may be a procedure of transmitting a response message for positioning to the positioning UE by the eNB and/or the UE that determines to participate in the groupcast positioning procedure as the candidate AN in [STEP 1-2].

The candidate AN may transmit the following main information that the positioning UE is capable of referring to for final AN selection through the response message for positioning.

Whether to perform GNSS-based positioning and related parameter

Whether to perform sensor-based positioning and related parameter

Whether to perform groupcast positioning and related parameter

Frequency band for performing positioning and frequency bandwidth-related information Whether to perform inter frequency groupcast positioning and related parameter Number of transceiving antennas PQI information of location information and location information of AN Information on RSRP or RSSI measured by AN Whether to participate in another groupcast positioning or another type positioning procedure Acceptance of a request message for positioning of a candidate AN may be transmitted through an SPP message or may be signal through a PSCCH and/or a PSSCH, PC5 RRC, or a MAC CE.

Rejection of the request message for positioning of the candidate AN may be transmitted through a SPP message or may be signaled through a PSCCH and/or a PSSCH, PC5 RRC, or a MAC CE. The candidate AN may not transmit the SPP message or signaling to implicitly reject the request message. That is, the positioning UE may perform the AN selection procedure with respect to a neighbor eNB and/or the UE, which transmit an accept message.

STEP 1-4

A next step may be a procedure of determining an eNB and/or a UE that participates in positioning as a final AN using response message information received from candidate messages in the aforementioned [STEP 1-3] by the positioning UE in [STEP 1-1]. That is, the next step may be a step of selecting a participating AN group with respect to the positioning UE.

The positioning UE may select a candidate AN for optimizing positioning performance as a final AN using the acquired location information of the candidate AN. For example, when approximate initial location information of the UE is given, the UE may select a candidate AN for improving the positioning performance of the UE from a topology point of view. According to an embodiment, when the UE selects three final ANs to perform positioning, the UE may finally select three candidate ANs that are capable of forming an equilateral triangle centered on the UE from a topology point of view. From a topology point of view, the positioning UE may not select the candidate An as the final AN when the location of the candidate AN does not help positioning of the UE.

According to an embodiment, when the number of ANs that are capable of participating in the groupcast positioning procedure is limited, the positioning UE may establish a ranking by comprehensively considering PQI information, RSSI or RSSI information, and topology information, and may sequentially select the final AN from candidate ANs with high priority. In this case, the number of final ANs that are capable of participating in the groupcast positioning procedure may be predefined according to an LBS (or irrespective of the LBS) or according to an area, or may be determined by a location server/LMF and/or an eNB and may be transferred to the eNB and the UE. That is, the number of final ANs may be differently configured depending on a service type, QoS of a service, or a road area.

According to another embodiment, the eNB and the UE may participate in the positioning procedure as a final AN according to determination of the location server/LMF and/ or the eNB. For example, an eNB and/or a UE having fixed location information may participate in the positioning procedure as a final AN.

STEP 1-5

A next step may be a PRS reservation procedure that is performed by the positioning UE in a subchannel pool of a PRS slot for request PRS transmission of the positioning UE and response PRS transmission of the final AN group.

The positioning UE may perform a reservation procedure for request PRS transmission and a reservation procedure for response PRS transmission in an AN group. Here, the request PRS reservation procedure may be a procedure of determining a request PRS pattern, a request PRS transmission location, and a request PRS effective time based on scheduling for request PRS transmission in a request PRS pool of an NR-V2X slot. The response PRS reservation procedure may be a procedure of determining a response PRS pattern, a response PRS transmission location, and a response PRS effective time based on scheduling for response PRS transmission in a response PRS pool of the PRS slot. In this case, the response PRS reservation of the positioning UE may be performed in consideration of the size of an AN group, and a plurality of response PRSs may be reserved at once.

Reservation by the positioning UE may be performed based on sensing or contention with another positioning UE. For example, a subchannel that is not used or is not supposed to be used by another positioning UE may be selected and reserved by sensing a subchannel pool of a PRS slot that is periodically or aperiodically transmitted, and a subchannel that is used or is supposed to be used by another positioning UE may not be selected or reserved.

STEP 1-6

A next step may be a procedure of transmitting request PRS and response PRS reservation information to the finally selected AN group by the positioning UE.

The request PRS and response PRS reservation information transferred to the AN group may be transmitted through an SPP message or may be signaled through a PSCCH and/or a PSSCH, PC5 RRC, or a MAC CE. In this case, response PRS reservation of a response PRS pattern, a response PRS transmission location, and a response PRS effective time for an AN may be performed by the positioning UE.

A candidate AN that does not receive reservation information of the response PRS from the positioning UE for a predetermined time may be excluded from the final AN group. In this case, when the final AN does not receive reservation information of the response PRS, the positioning UE may be implicitly excluded in a procedure of performing final positioning.

STEP 1-7

A next step may be a procedure of transmitting a request PRS to the AN group by the positioning UE and, in response thereto, transmitting a response PRS by the AN group.

The positioning UE may transmit the request PRS to the corresponding AN group and may record a transmission time using the reserved request PRS pattern information, and symbol number information.

Each AN of the AN group may record a reception time of the request PRS received from the positioning UE.

Each AN of the AN group may transmit a response PRS to the corresponding positioning UE and may record a transmission time using the reserved response PRS pattern information and symbol number information.

STEP 1-8

A next step may be a procedure in which the positioning UE performs groupcast positioning using the response PRS received from the AN group and a measured ToA value or TRTD value by each AN.

The positioning UE may record the reception time of the response PRS received from the AN group. The positioning UE may receive the measured ToA value or TRTD value by each AN of the AN group through a PSSCH of an NR-V2X slot.

The positioning UE may perform groupcast positioning using information on a request PRS transmission time of the positioning UE, a request PRS reception time of each AN, a response PRS transmission time of each AN, and a response PRS reception time of the positioning UE.

Step of determining weight of AN: The positioning UE may improve the accuracy of positioning by applying different weights to respective ANs.

The positioning UE may determine a weight for an AN using location information of each AN. That is, from a topology point of view, a high weight may be configured for the AN determined that is determined to have a large influence on positioning performance improvement, and a low weight may be configured for the AN determined that is determined to have a relatively small influence on the positioning performance.

The positioning UE may determine a weight for an AN using PQI information provided by each An. That is, a high weight may be configured for the AN that provides a high PQI, and a low weight may be configured for the AN that provides a relatively low PQI. In this case, the high and low of the PQI may be determined as an absolute value or a relative value.

Positioning step: The positioning UE may perform positioning using location information of the An and weight information of the AN.

The positioning UE may measure the location of the UE by calculating coordinates of intersections of a plurality of circles after drawing the circles with the locations of ANs as center points using the ToA value and location information measured from each AN. In this case, the location of the UE may be corrected or improved by weight for each AN.

The positioning UE may measure the location of the UE by calculating coordinates of intersections of two hyperbolas after drawing a hyperbola with the locations of two ANs as focal points, respectively and a difference between two ToA values measured from a pair of ANs and then drawing another hyperbola from TOA values of another pair of TOA values. In this case, the positioning UE may correct or improve the location of the UE by applying a weight for each AN.

The positioning UE may not use information of an AN in groupcast positioning in the following cases.

When reception of the response PRS is delayed or fails, information of the corresponding AN may not be used for positioning.

When reception of a measured ToA value or TRTD value of the AN through a PSS CH of the NR-V2X slot is delayed, information of the corresponding AN may not be used for positioning.

[Embodiment 2-2]: Groupcast Positioning Procedure in Consideration of Groupcast Slot Structure-2

Hereinafter, a sidelink groupcast positioning procedure using a second groupcast positioning slot structure-2 similar to the aforementioned groupcast positioning slot structure-1 will be described.

FIG. 16 illustrates a groupcast positioning slot structure-2. The main structural feature and operation method related to a groupcast positioning operation will be described below.

Feature and Operation Method of Groupcast Positioning Slot Structure-2:

The UE may transmit a request PRS using a request PRS pool resource of an NR-V2X slot. An AN group may transmit a response PRS using the response PRS pool resource of the PRS slot in response to the request PRS received from the UE. In addition, each AN of the AN group may transmit the measured ToA value or TRTD value through a PS SCH of the NR-V2X slot.

The UE may transmit scheduling information for a PRS related to the UE, scheduling information for a PRS related to the AN group, and information related to PRS reservation through a PSCCH and/or a PSSCH of the NR-V2X slot.

Hereinafter, a sidelink groupcast positioning procedure using the groupcast positioning slot structure-2 will be described. The sidelink groupcast positioning procedure using the groupcast positioning slot structure-2 may be performed in a similar way to the aforementioned positioning procedure based on the groupcast positioning slot structure-1 except for the reservation procedure of the request PRS for the positioning UE and the response PRS for the final AN group in [STEP 2-5].

[STEP 2-0]: This may be performed except for the procedure of acquiring subchannel-related information in the PRS slot in [STEP 1-0] of the positioning procedure based on the groupcast positioning slot structure-1.

[STEP 2-1]: This may be performed in the same way to [STEP 1-1] of the positioning procedure of the groupcast positioning slot structure-1.

[STEP 2-2]: This may be performed in the same way to [STEP 1-2] of the positioning procedure of the groupcast positioning slot structure-1.

[STEP 2-3]: This may be performed in the same way to [STEP 1-3] of the positioning procedure of the groupcast positioning slot structure-1.

[STEP 2-4]: This may be performed in the same way to [STEP 1-4] of the positioning procedure of the groupcast positioning slot structure-1.

[STEP 2-5]: This may be a reservation procedure of the request PRS for the positioning UE and the response PRS for the final AN group, and the positioning UE may select and reserve a request PRS and a response PRS that are not used or are not supposed to be used in a request PRS pool and a response PRS pool through PSCCH and/or PSSCH information received from a neighbor eNB and/or a UE.

[STEP 2-6]: This may be performed in the same way to [STEP 1-6] of the positioning procedure of the groupcast positioning slot structure-1.

[STEP 2-7]: This may be performed in the same way to [STEP 1-7] of the positioning procedure of the groupcast positioning slot structure-1.

[STEP 2-8]: This may be performed in the same way to [STEP 1-8] of the positioning procedure of the groupcast positioning slot structure-1.

[Embodiment 2-3]: Groupcast Positioning Procedure in Consideration of Groupcast Slot Structure-3

Hereinafter, a sidelink groupcast positioning procedure based on a groupcast positioning slot structure-3 will be described.

FIG. 18 illustrates a groupcast positioning slot structure-3, and the main structural feature and operation method related to a groupcast positioning operation will be described below.

Feature and Operation Method of Groupcast Positioning Slot Structure-3:

The positioning UE may transmit a request PRS using a request PRS pool resource of the PRS slot. In this case, the PRS slot may be a slot inserted into an NR-V2X system and may include a subchannel pool and a request PRS pool. Here, a subchannel may be located after the request PRS pool and may include a plurality of RBs. A frequency bandwidth of the request PRS may be allocated through a plurality of RB configurations, and FIG. 18 illustrates an embodiment of transmitting one request PRS through an entire available frequency bandwidth.

The AN group may transmit a response PRS using a response PRS pool resource of the PRS slot in response to the request PRS received from the positioning UE. In this case, the frequency bandwidth of the request PRS may be allocated through a plurality of RB configurations, and FIG. 18 illustrates an embodiment in which one request PRS is transmitted through an entire available frequency bandwidth.

The positioning UE may transmit a PSCCH and/or a PSSCH including scheduling information for the request PRS, scheduling information for the response PRS related to the AN group, and information related to request/response PRS reservation through a subchannel pool of the PRS slot. In this case, each subchannel may include information related to one UE and an AN group that participates in groupcast positioning.

Each An of the AN group may transmit a measured ToA value or TRTD value through a PSSCH of the NR-V2X slot.

Hereinafter, a procedure for performing sidelink groupcast positioning using the groupcast positioning slot structure-3 will be described. In particular, the main feature thereof compared with the groupcast positioning slot structure-1 will be described.

[STEP 3-0]: This may be performed except for the procedure of acquiring information related to the NR-V2X slot structure in [STEP 1-0] of the positioning procedure based on the groupcast positioning slot structure-1.

Acquire groupcast positioning operation-related information

Acquire PRS slot structure information
  Number of PRS slots for use of request PRS pool
  Number of PRS slots for use of response PRS pool
  Number of subchannels in PRS slot: Maximum number of positioning UEs to be supported by one PRS slot
  Pattern and number of request PRSs to be simultaneously transmitted through the same OFDM symbol
  Pattern and number of request PRSs to be simultaneously transmitted through the same OFDM symbol
  Number of OFDM symbols to be used for request PRS transmission by positioning UE
  Number of OFDM symbols to be used for request PRS transmission by AN group

[STEP 3-1]: This may be performed in the same way to [STEP 1-1] of the positioning procedure of the groupcast positioning slot structure-1.

[STEP 3-2]: This may be performed in the same way to [STEP 1-2] of the positioning procedure of the groupcast positioning slot structure-1.

[STEP 3-3]: This may be performed in the same way to [STEP 1-3] of the positioning procedure of the groupcast positioning slot structure-1.

[STEP 3-4]: This may be performed in the same way to [STEP 1-4] of the positioning procedure of the groupcast positioning slot structure-1.

[STEP 3-5]: A next step may be a PRS reservation procedure performed in a subchannel pool of a PRS slot by a positioning UE for request PRS transmission of the positioning UE and response PRS response of a final AN group.

The positioning UE may perform a reservation procedure for request PRS transmission and a reservation procedure for response PRS transmission in an AN group through the PRS slot. That is, a subchannel that is not used or is not supposed to be used by another positioning UE may be selected and reserved by sensing a subchannel pool of the PRS slot, and a subchannel that is used or is supposed to be used by another positioning UE may not be selected or reserved.

[STEP 3-6]: This may be performed in the same way to [STEP 1-6] of the positioning procedure of the groupcast positioning slot structure-1.

[STEP 3-7]: This may be performed in the same way to [STEP 1-7] of the positioning procedure of the groupcast positioning slot structure-1.

[STEP 3-8]: This may be performed in the same way to [STEP 1-8] of the positioning procedure of the groupcast positioning slot structure-1.

[Embodiment 2-4]: Groupcast Positioning Procedure in Consideration of Groupcast Slot Structure-4

Hereinafter, a sidelink groupcast positioning procedure using a groupcast positioning slot structure-4 similar to the aforementioned groupcast positioning slot structure-3 will be described.

FIG. 20 illustrates a groupcast positioning slot structure-4, and the main structural feature and operation method related to a groupcast positioning operation will be described below.

Feature and Operation Method of Groupcast Positioning Slot Structure-2

The positioning UE may transmit a request PRS using a request PRS pool resource of the PRS slot and the AN group may transmit a response PRS using a response PRS pool resource of the PRS slot in response to the request PRS received from the UE. In addition, each AN of the AN group may transmit a measured ToA value or TRTD value through a PSSCH of the NR-V2X slot.

The positioning UE may transmit scheduling information for the request PRS, scheduling information for the response PRS related to the AN group, and information of request/response PRS reservation through a PSCCH and/or a PSSCH of the NR-V2X slot.

Hereinafter, the sidelink groupcast positioning procedure using the groupcast positioning slot structure-2 will be described. The sidelink groupcast positioning procedure using the groupcast positioning slot structure-2 may be performed in a similar way to the aforementioned positioning procedure based on the groupcast positioning slot structure-1 except for the reservation procedure of the request PRS for the positioning UE and the response PRS for the final AN group in [STEP 4-5].

[STEP 4-0]: This may be performed except for the procedure of acquiring subchannel-related information in the PRS slot in [STEP 1-0] of the positioning procedure based on the groupcast positioning slot structure-1.

[STEP 4-1]: This may be performed in the same way to [STEP 1-1] of the positioning procedure of the groupcast positioning slot structure-1.

[STEP 4-2]: This may be performed in the same way to [STEP 1-2] of the positioning procedure of the groupcast positioning slot structure-1.

[STEP 4-3]: This may be performed in the same way to [STEP 1-3] of the positioning procedure of the groupcast positioning slot structure-1.

[STEP 4-4]: This may be performed in the same way to [STEP 1-3] of the positioning procedure of the groupcast positioning slot structure-1.

[STEP 4-5]: This may be a reservation procedure of the request PRS for the positioning UE and the response PRS for the final AN group, and the positioning UE may select and reserve a request PRS and a response PRS that are not used or are not supposed to be used in a request PRS pool and a response PRS pool through PSCCH and/or PSSCH information received from a neighbor eNB and/or a UE.

[STEP 4-6]: This may be performed in the same way to [STEP 1-6] of the positioning procedure of the groupcast positioning slot structure-1.

[STEP 4-7]: This may be performed in the same way to [STEP 1-7] of the positioning procedure of the groupcast positioning slot structure-1.

[STEP 4-8]: This may be performed in the same way to [STEP 1-8] of the positioning procedure of the groupcast positioning slot structure-1.

The present disclosure relates to a procedure for directly performing positioning with a neighbor AN group using sidelink without the help of a location server/LMF and/or an eNB by a UE. In particular, the present disclosure proposes a groupcast positioning procedure in consideration of four groupcast positioning slot structures for transmitting a request PRS to an AN group by the positioning UE and, in response thereto, transmitting a response PRS to the positioning UE by the AN group. The groupcast positioning slot structure according to the present disclosure may provide the following advantages.

A method of performing a positioning procedure by a UE may have high speed compared with a conventional location measuring method of a UE through a location server/LMF and an eNB.

The groupcast positioning slot structure-1/2 may use an SRS transmission resource structure of an existing NR-V2X slot for request PRS transmission of a positioning UE and may insert an independent PRS slot for response PRS transmission of an AN group, and thus may be capable of performing a groupcast positioning operation without causing interference to an existing NR-V2X slot and service operation.

The groupcast positioning slot structure-3/4 may be capable of performing a groupcast positioning operation without causing interference to the existing NR-V2X slot and service operation through independent PRS slot insertion for request PRS transmission of the positioning UE and response PRS transmission of the AN group.

The groupcast positioning slot structure-1/3 may add a PSCCH for transmitting scheduling information for a PRS related to the positioning UE, scheduling information for a PRS related to the AN group, and information related to PRS reservation to a PRS slot, thereby reducing the amount of signaling overhead for a PRS operation related to groupcast positioning. In addition, the efficiency of a PRS reservation procedure required in the groupcast positioning procedure may be increased.

Figure 21:
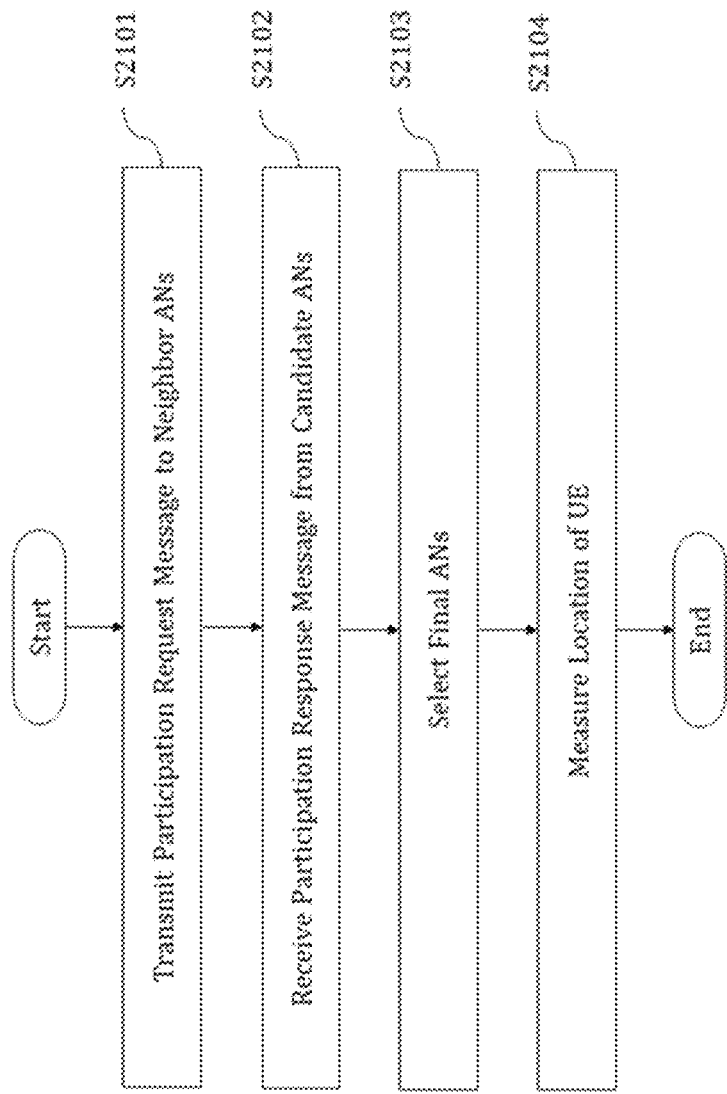

FIG. 21 is a flowchart for explaining embodiment(s) of the present disclosure.

Referring to FIG. 21, in step S2101, a UE may transmit a participation request message to neighbor anchor nodes (ANs) around the UE. In this case, the participation request message may include a minimum positioning quality indicator (PQI) value. The PQI may refer to the reliability of location information of an AN, and the minimum PQI value transmitted by the UE may refer to a minimum value of PQI values of candidate ANs that are supposed to transmit a participation response message.

In step S2102, the UE may receive the participation response message from the candidate ANs among the neighbor ANs. In this case, the PQI of the candidate ANs may be equal to or greater than the minimum PQI value. A channel utilization ratio of the candidate ANs may be equal to or greater than a threshold. A channel state value between the UE and the candidate AN may be equal to or greater than a threshold. In this case, the channel state value may be a RSRP or RSSI value.

The participation response message may include location information of candidate ANs and a PQI value of the location information. The UE may select final ANs to be used below to measure the location of the UE using information included in the participation response message.

In step S2103, the UE may select the final ANs used to measure the location of the UE among the candidate ANs.

In step S2104, the UE may measure the location of the UE using the final ANs. In more detail, the UE may reserve a resource for the request PRS and the response PRS and may transmit scheduling information to the final ANs. The UE may transmit the request PRS to the final ANs and may receive the response PRS from the final ANs. The UE may measure the location of the UE using the request PRS and the response PRS. For example, the UE may receive information on the reception time of the request PRS and the transmission time of the response PRS from the final ANs, and may measure the location of the UE using the transmission time of the request PRS, the reception time of the request PRS, the transmission time of the response PRS, and the reception time of the response PRS.

Example of Communication System to Which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
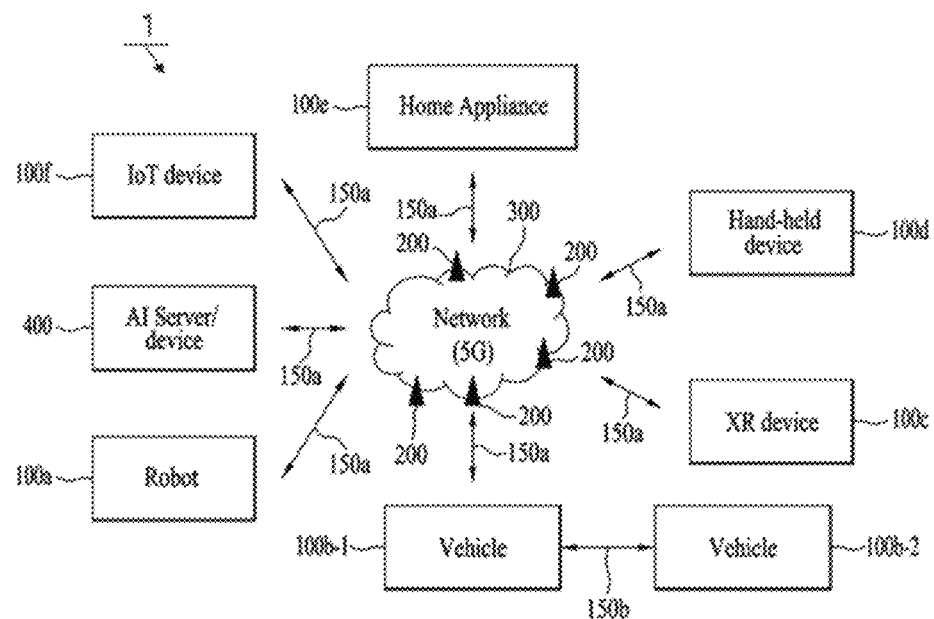
FIGS. 22 to 31 are block diagrams illustrating various devices applicable to embodiment(s) of the present disclosure.

FIG. 22 illustrates a communication system applied to the present disclosure.

Referring to FIG. 22, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to Which the Present Disclosure is Applied

Figure 23:
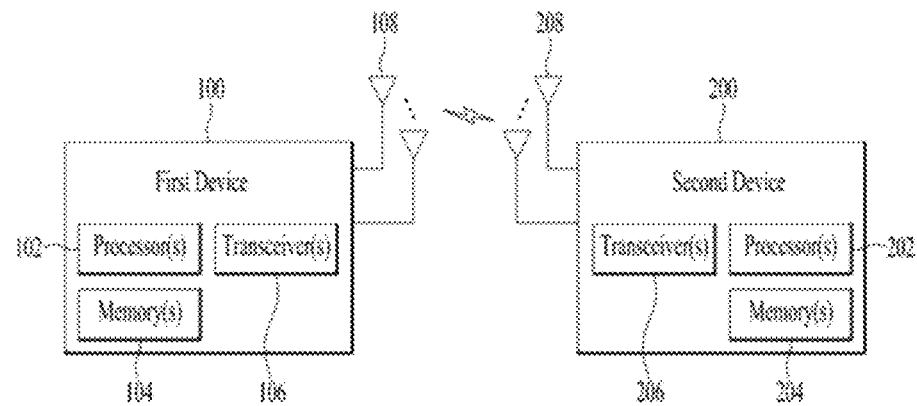

FIG. 23 illustrates wireless devices applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Here, a wireless communication technology implemented in the wireless devices 100 and 200 in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in the wireless devices 100 and 200 may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices 100 and 200 according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various standards such as IEEE 802.15.4 and may be called various terms.

Example of a Signal Process Circuit to Which the Present Disclosure is Applied

FIG. 24 illustrates a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 44. For example, the wireless devices (e.g., 100 and 200 of FIG. 43) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
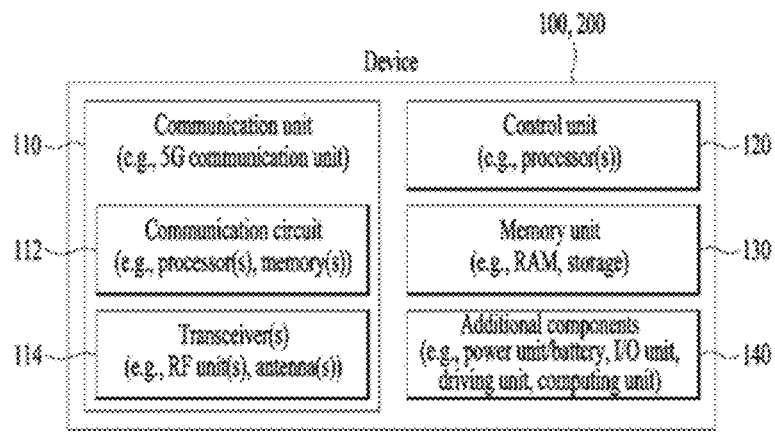

Application Example of a Wireless Device to which the Present Disclosure is Applied FIG. 25 illustrates another example of a wireless device applied to the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 45 will be described in detail with reference to the drawings.

Example of Hand-Held Device to Which the Present Disclosure is Applied

Figure 26:
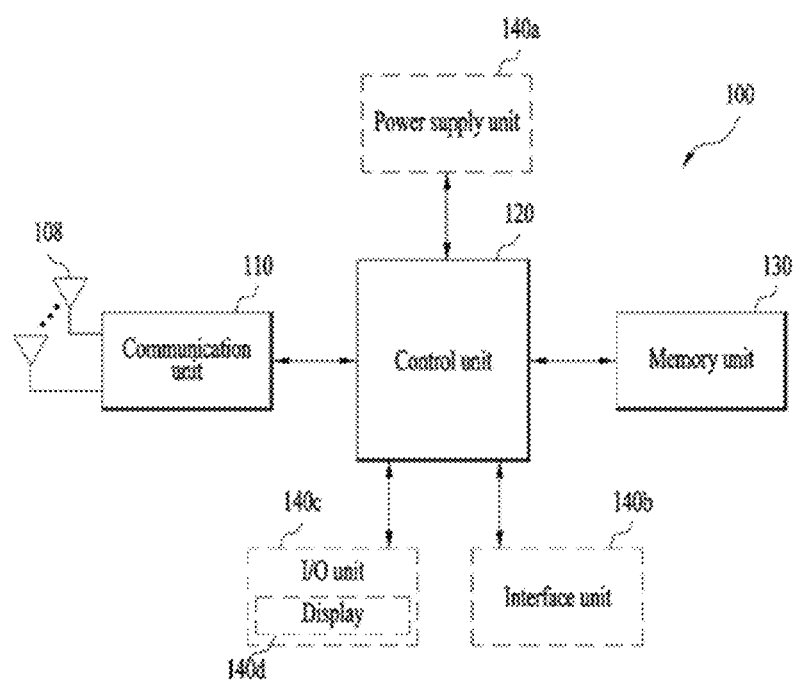

FIG. 26 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
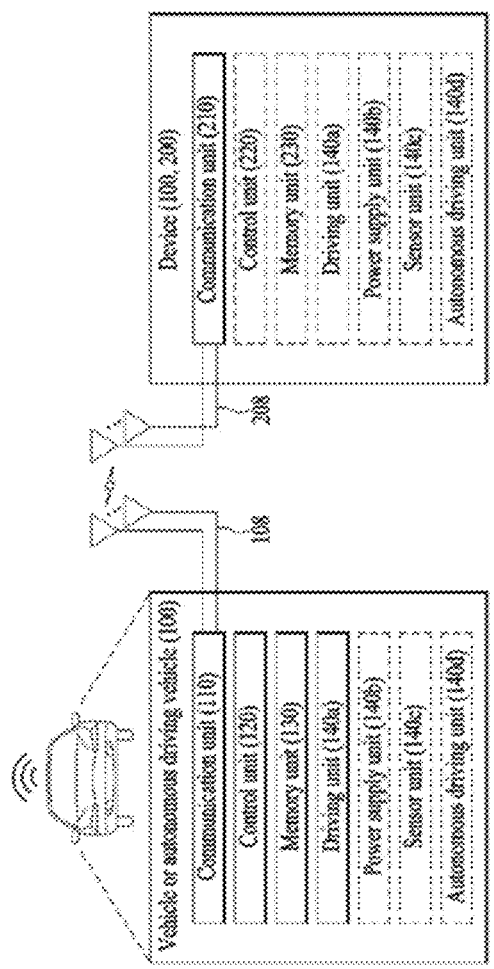

Example of a Vehicle or an Autonomous Driving Vehicle to Which the Present Disclosure is Applied FIG. 27 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to Which the Present Disclosure is Applied

Figure 28:
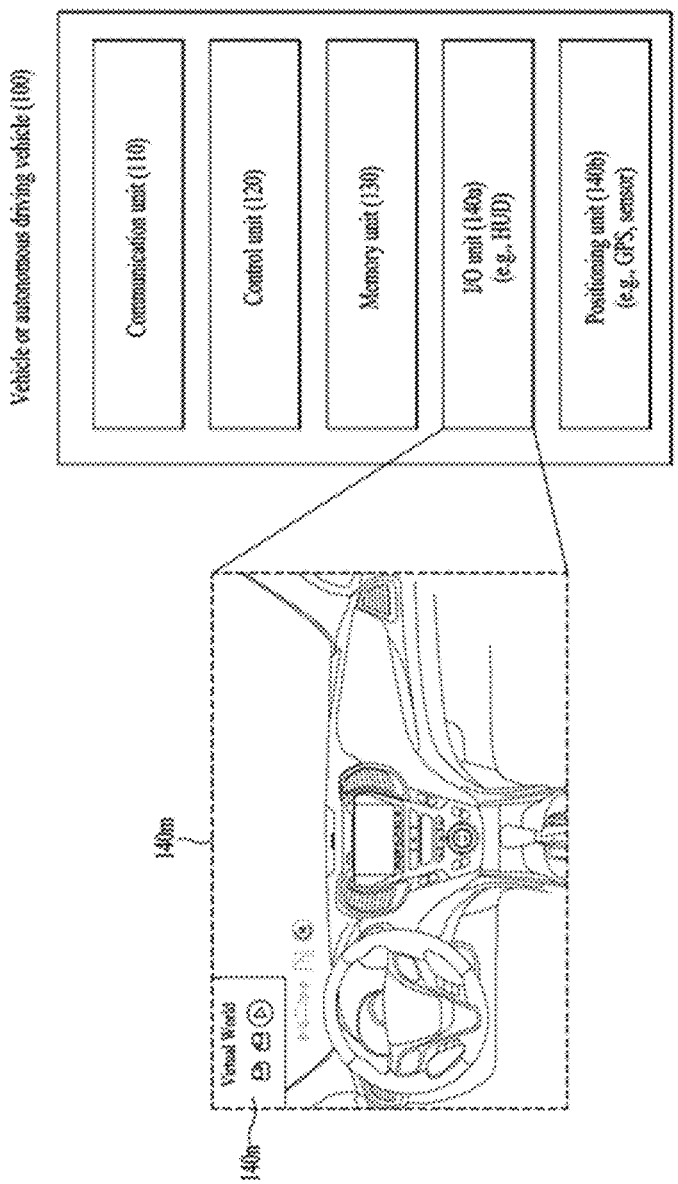

FIG. 28 illustrates a vehicle applied to the present disclosure. The vehicle may be implemented as a transport means, an aerial vehicle, a ship, etc.

Referring to FIG. 28, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 25.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of XR Device to Which the Present Disclosure is Applied

Figure 29:
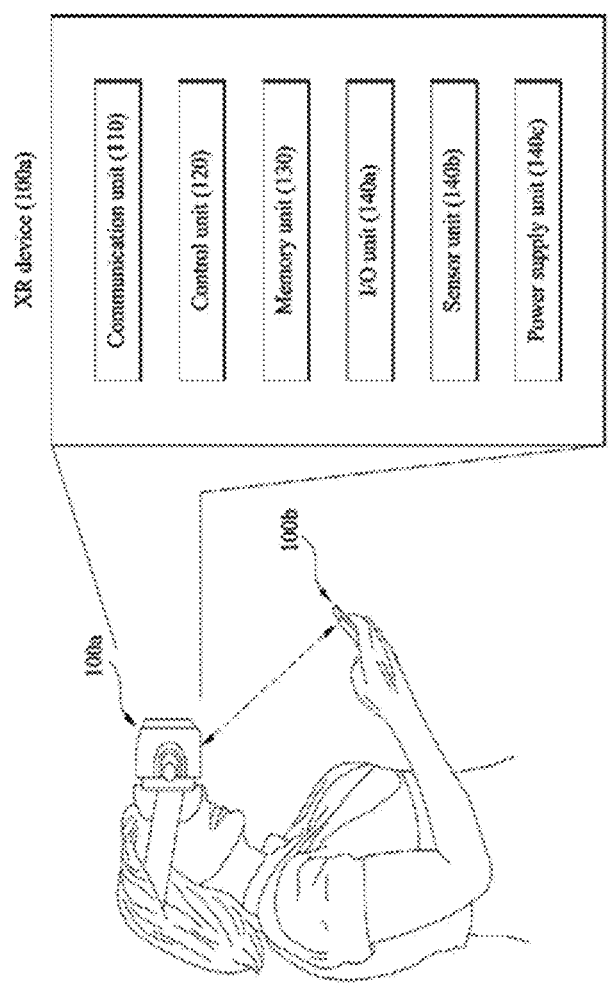

FIG. 29 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 29, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 25, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of Robot to Which the Present Disclosure is Applied

Figure 30:
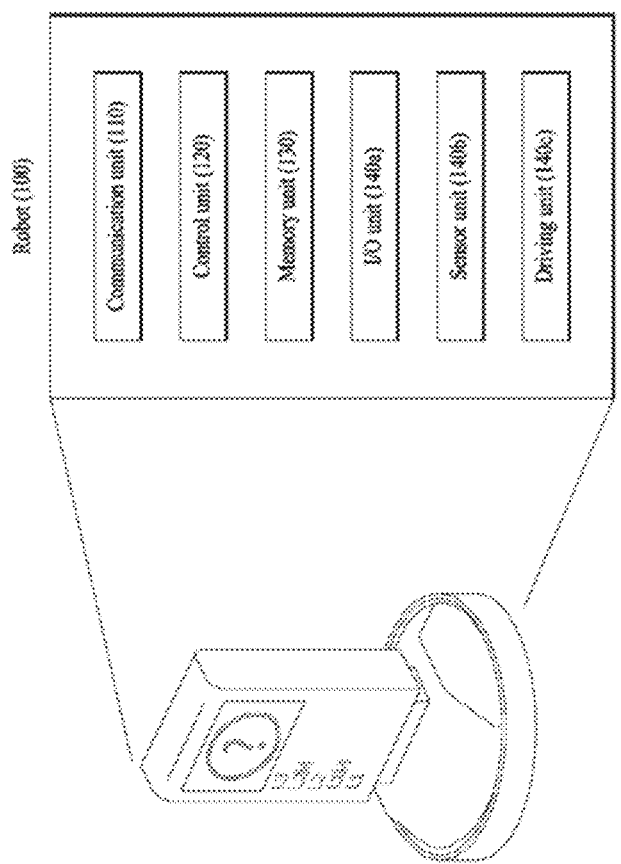

FIG. 30 illustrates a robot applied to the present disclosure. The robot may be categorized into an industrial robot, a medical robot, a household robot, a military robot, etc., according to a used purpose or field.

Referring to FIG. 30, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 25, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of AI Device to Which the Present Disclosure is Applied

Figure 31:
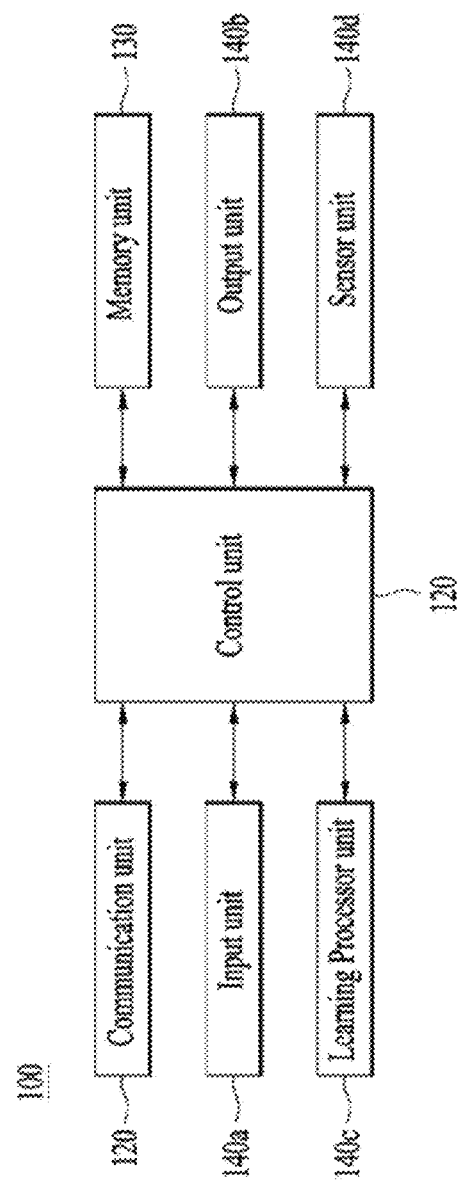

FIG. 31 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 31, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 25, respectively.

The communication unit 110 may transmit and receive wired/radio signals (e.g., sensor information, user input, learning models, or control signals) to and from external devices such as other AI devices (e.g., 100x, 200, or 400 of FIG. 22) or an AI server (e.g., 400 of FIG. 22) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 22). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 22). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:
1. A method for performing an operation by a user equipment (UE) in a wireless communication system, the method comprising:
transmitting a request message for participation to first nodes;

receiving a response message for the participation from second nodes among the first nodes, wherein the response message includes location information of the second nodes and a positioning quality indicator (PQI) value of the location information;

selecting third nodes used to measure a location of the UE among the second nodes; and measuring the location of the UE based on the third nodes.

2. The method of claim 1, wherein the measuring the location of the UE includes:

transmitting a first reference signal (RS) related to positioning to the third nodes;

receiving a second RS responding to the first RS from the third nodes; and measuring the location of the UE based on the first RS and the second RS.

3. The method of claim 2, further comprising:

reserving a resource for the first RS and the second RS; and transmitting information on the reserved resource to the third nodesfinal ANs.

4. The method of claim 2, further comprising:

receiving information on a reception time of the first RS and a transmission time of the second RS from the third nodes, wherein the location of the UE is measured based on at least one of a transmission time of the first RS, a reception time of the first RS, a transmission time of the second RS, and a reception time of the second RS.

5. The method of claim 1, wherein:

the request message includes a minimum positioning quality indicator (PQI) value; and the second nodes have a PQI value above the minimum PQI value.

6. The method of claim 1, wherein the second nodes have a channel utilization ratio above a threshold.

7. The method of claim 1, wherein a channel state value of the second nodes and the UE is above a threshold.

8. The method of claim 2, wherein the first RS is transmitted in a vehicle-to-everything (V2X) slot or a slot for a RS related to the positioning.

9. The method of claim 2, wherein the second RS is transmitted in a vehicle-to-everything (V2X) slot or a slot for a RS related to the positioning.

10. A user equipment (UE) in a wireless communication system, the UE comprising:

at least one processor; and at least one computer memory operatively connected to the at least one processor and configured to store commands for allowing the at least one processor to perform operations when being executed, wherein the operation includes:

transmitting a request message for participation to first nodes;

receiving a response message for the participation from second nodes among the first nodes, wherein the response message includes location information of the second nodes and a positioning quality indicator (PQI) value of the location information;

selecting third nodes used to measure a location of the UE among the second nodes; and measuring the location of the UE based on the third nodes.

11. The UE of claim 10, wherein the UE communicates with at least one of another UE, a UE related to an autonomous driving vehicle, a base station (BS), or a network.

12. A processor for performing operations for a user equipment (UE) in a wireless communication system, the operations comprising:

transmitting a request message for participation to first nodes;

receiving a response message for the participation from second nodes among the first nodes, wherein the response message includes location information of the second nodes and a positioning quality indicator (PQI) value of the location information;

selecting third nodes used to measure a location of the UE among the second nodes; and measuring the location of the UE based on the third nodes.

* * * * *